United States Patent
Gadgil et al.

(10) Patent No.: US 12,549,766 B2
(45) Date of Patent: Feb. 10, 2026

(54) ROTATION-ENABLED HIGH DYNAMIC RANGE VIDEO ENCODING

(71) Applicant: Dolby Laboratories Licensing Corporation, San Francisco, CA (US)

(72) Inventors: Neeraj J. Gadgil, Pune (IN); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/563,736

(22) PCT Filed: May 24, 2022

(86) PCT No.: PCT/US2022/030777
§ 371 (c)(1),
(2) Date: Nov. 22, 2023

(87) PCT Pub. No.: WO2022/256205
PCT Pub. Date: Dec. 8, 2022

(65) Prior Publication Data
US 2024/0283975 A1 Aug. 22, 2024

Related U.S. Application Data

(60) Provisional application No. 63/195,249, filed on Jun. 1, 2021.

(30) Foreign Application Priority Data

Jun. 1, 2021 (EP) ..................................... 21177098

(51) Int. Cl.
*H04N 19/00* (2014.01)
*H04N 19/172* (2014.01)
(Continued)

(52) U.S. Cl.
CPC ........... *H04N 19/60* (2014.11); *H04N 19/172* (2014.11); *H04N 19/182* (2014.11); *H04N 19/186* (2014.11)

(58) Field of Classification Search
None
See application file for complete search history.

(56) References Cited

U.S. PATENT DOCUMENTS 8,373,721 B2  2/2013  Wong
9,369,684 B2  6/2016  Lim
(Continued)

FOREIGN PATENT DOCUMENTS

WO    2017024042 A2    2/2017
WO    2019170465 A1    9/2019
(Continued)

OTHER PUBLICATIONS

Berns. "Billmeyer and Saltzman's Principles of Color Technology: Fourth Edition". (Year: 2019).*
(Continued)

*Primary Examiner* — Zhihan Zhou

(57) ABSTRACT

Methods for encoding and decoding video data. One method includes receiving video data, the video data composed of a plurality of image frames, each image frame including a plurality of pixels. The method includes determining, for each image frame, a rotation matrix, determining, for each image frame, at least one of a scaling factor and an offset factor, and determining, for each image frame, a reshaping function based on one or more values of each of the plurality of pixels. The method includes generating an output image for each image frame by applying the rotation matrix, the reshaping function, and the at least one of the scaling factor and the offset factor to the respective image frame. The rotation matrix is applied to each pixel of the plurality of (Continued)

pixels for the respective image frame before the reshaping function is applied to the respective image frame.

12 Claims, 20 Drawing Sheets

(51) Int. Cl.
*H04N 19/182* (2014.01)
*H04N 19/186* (2014.01)
*H04N 19/60* (2014.01)

(56) References Cited

U.S. PATENT DOCUMENTS

| | | | |
|---|---|---|---|
| 9,497,456 | B2 | 11/2016 | Su |
| 9,723,319 | B1 | 8/2017 | Pereira |
| 10,032,262 | B2 | 7/2018 | Kheradmand |
| 10,397,586 | B2 | 8/2019 | Su |
| 10,542,296 | B2 | 1/2020 | Lu |
| 10,701,375 | B2 | 6/2020 | Su |
| 2011/0141353 | A1* | 6/2011 | Wong .................. G06T 11/001 348/E7.003 |
| 2014/0247869 | A1* | 9/2014 | Su .......................... H04N 19/30 375/240.03 |
| 2017/0186141 | A1 | 6/2017 | Ha |
| 2017/0221189 | A1* | 8/2017 | Kheradmand ............ G06T 7/90 |
| 2018/0007356 | A1 | 1/2018 | Kadu |
| 2018/0160088 | A1 | 6/2018 | Urban |
| 2018/0374192 | A1 | 12/2018 | Kunkel |
| 2019/0110054 | A1* | 4/2019 | Su ........................ H04N 19/154 |
| 2019/0364301 | A1 | 11/2019 | Atkins |
| 2021/0035273 | A1 | 2/2021 | Deng |

FOREIGN PATENT DOCUMENTS

| | | |
|---|---|---|
| WO | 2020048790 A1 | 3/2020 |
| WO | 2022103902 A1 | 5/2022 |

OTHER PUBLICATIONS

Anonymous: "Rotation matrix—Wikipedia", Jul. 10, 2018 (Jul. 10, 2018), XP055798131, Retrieved from the Internet: URL:https://en.wikipedia.org/w/index.php?title=Rotation_matrix&oldid=849581231 [retrieved on Apr. 22, 2021], p. 3-p. 4.

Kerofsky, Louis et al., "Recent developments from MPEG in HDR video compression", 2016 IEEE International Conference on Image Processing (ICIP), Aug. 19, 2016, pp. 879-883.

Lu, Taoran et al., "Compression Efficiency Improvement over HEVC Main 10 Profile for HDR and WCG Content", 2016 Data Compression Conference (DCC), IEEE, Mar. 30, 2016 (Mar. 30, 2016), pp. 279 288. XP03307271011 DOI:10.1109/DCC.2016.99 abstract sections 1 and 3 figures 3-6.

* cited by examiner

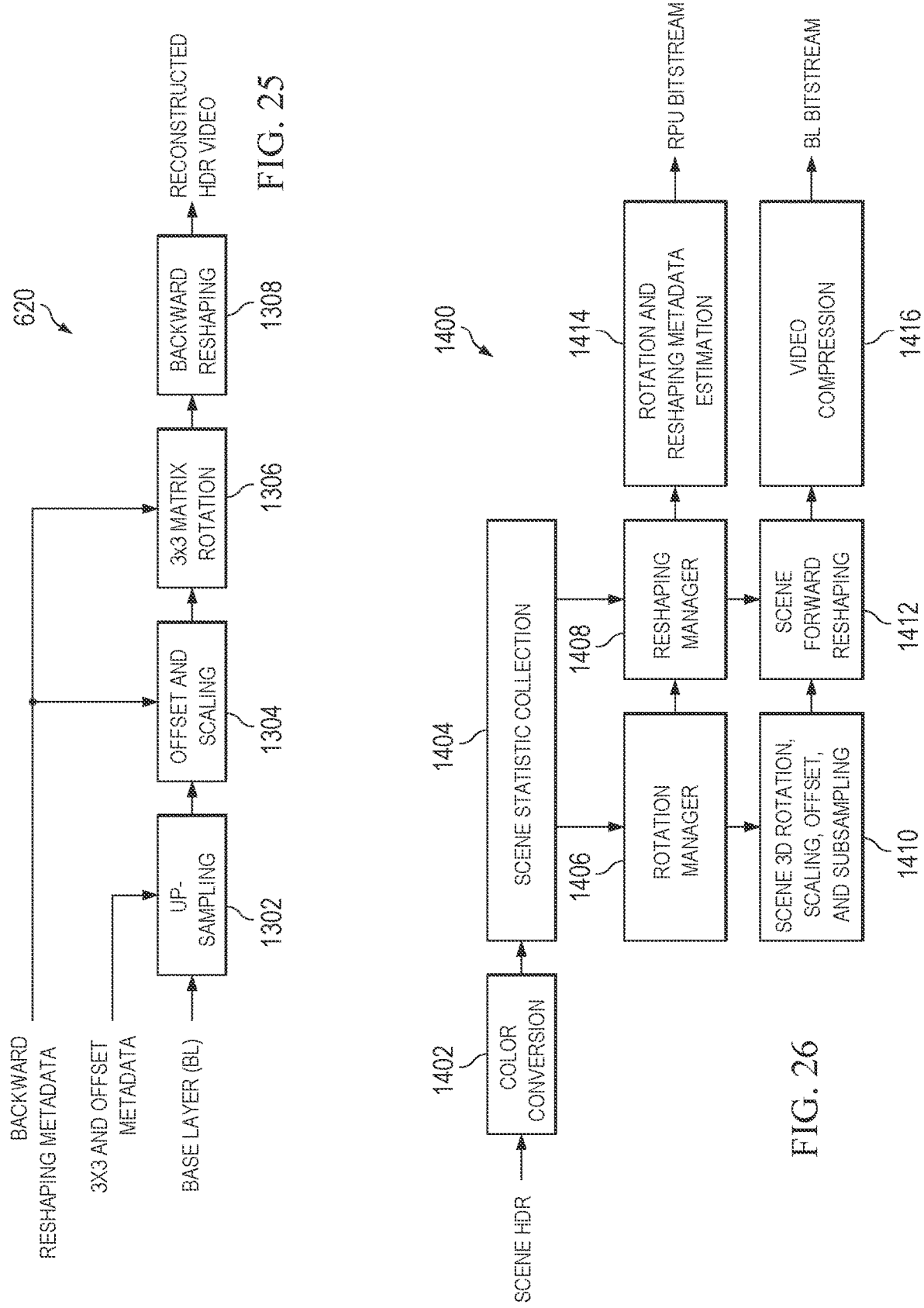

ROTATION-ENABLED HIGH DYNAMIC RANGE VIDEO ENCODING

CROSS REFERENCE TO RELATED APPLICATIONS

This application is a U.S. National Stage application under U.S.C. 371 of International Application No. PCT/US2022/030777, filed on 24 May 2022 (reference: D21017WO01), which claims priority to European Patent Application No. 21177098.7, filed 1 Jun. 2021 and U.S. provisional application 63/195,249, filed 1 Jun. 2021, all of which are incorporated herein by reference in their entirety.

FIELD OF THE DISCLOSURE

This application relates generally to systems and methods of encoding and decoding high dynamic range (HDR) video data in three-dimensional space.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). As the luminance capabilities of HDR displays increases, viewers experience more drastic changes between dark and bright luminance that may cause discomfort.

Additionally, High Dynamic Range (HDR) content authoring is now becoming widespread as this technology offers more realistic and lifelike images than earlier formats. However, many display systems, including hundreds of millions of consumer television displays, are not capable of reproducing HDR images. Furthermore, because of the wide range of HDR displays (say, from 1,000 nits to 5,000 nits or more) HDR content optimized on one HDR display may not be suitable for direct playback on another HDR display. Additionally, HDR content often has false-contouring, or "banding", due to higher bit depth information being represented (and quantized) using a lower bit-depth signal. For example, 8-bit offers only 256 codewords.

BRIEF SUMMARY OF THE DISCLOSURE

In growing uses for HDR content, such as cloud-based gaming, there is a need to transmit HDR video data to target display devices (e.g., a TV) using encoding, such as 8-bit base layer (BL) that has minimum latency. For cloud gaming cases specifically, 8-bit advanced video coding (AVC) BL may be needed. Accordingly, encoders for such cases need to transfer HDR content to a lower bit-depth-domain and provide metadata for the receiving decoder such that the decoder reconstructs the HDR content from the decompressed BL.

For HDR content, the 8-bit pipeline is likely to have false-contouring (e.g., "banding") in several regions of the content when compared to high efficiency video coding (HEVC)-10 bit. As human visual systems are most sensitive to luminance (or "luma"), the Y-channel within the YCbCr (or "YCC") color space, more codewords can be created for the Y-channel. A 3D rotation may be used to effectively "tilt" the Y-axis of the YCbCr space to accommodate a higher number of luma codewords. This allows reduction of Y-channel quantization errors when computed between the original HDR and the reconstructed signal at the decoder. Additionally, the increase in luma codewords reduces visual banding and improves the HDR viewing experience. Another aspect of cloud-gaming is unicasting, where the cloud-encoder needs to provide streams to each of a variety of target devices (e.g., different TV models). Original HDR content (e.g., 4000 nits) may be mapped down to the device's target luminance (such as 700 nits).

Various aspects of the present disclosure relate to devices, systems, and methods for encoding and decoding video data in three-dimensional space. While certain embodiments are directed to HDR video data, video data may also include Standard Dynamic Range (SDR) video data and other User Generated Content (UGC), such as gaming content.

In one exemplary aspect of the present disclosure, there is provided a method for encoding video data. The method comprises receiving the video data, the video data composed of a plurality of image frames, each image frame including a plurality of pixels. The method comprises determining, for each image frame, a rotation matrix, wherein applying the rotation matrix to each pixel of the plurality of pixels rotates the video data around a chroma-neutral point in a three dimensional color space, determining, for each image frame, at least one of a scaling factor and an offset factor, and determining, for each image frame, a reshaping function based on one or more values of each of the plurality of pixels. The method comprises generating an output image for each image frame by applying the rotation matrix, the reshaping function, and the at least one of the scaling factor and the offset factor to the respective image frame. The rotation matrix is applied to each pixel of the plurality of pixels for the respective image frame before the reshaping function is applied to the respective image frame.

In another exemplary aspect of the present disclosure, there is provided a non-transitory computer-readable medium storing instructions that, when executed by a processor of a video delivery system, cause the video delivery system to perform operations comprising receiving video data, the video data composed of a plurality of image frames, each image frame including a plurality of pixels, determining, for each image frame, a rotation matrix, wherein applying the rotation matrix to each pixel of the plurality of pixels rotates the video data around a chroma-neutral point in a three dimensional color space, determining, for each image frame, at least one of a scaling factor and an offset factor, determining, for each image frame, a reshaping function based on one or more values of each of the plurality of pixels, and generating an output image for each image frame by applying the rotation matrix, the reshaping function, and the at least one of the scaling factor and the offset factor to the respective image frame. The rotation matrix is applied to each pixel of the plurality of pixels for the respective image frame before the reshaping function is applied to the respective image frame.

In another exemplary aspect of the present disclosure, there is provided a method for encoding video data. The method comprises receiving the video data, the video data composed of a plurality of image frames, each image frame including a plurality of pixels. The method comprises determining, for each image frame, a rotation matrix, wherein applying the rotation matrix to each pixel of the plurality of pixels rotates the video data around a chroma-neutral point in a three dimensional color space, determining, for each image frame, at least one of a scaling factor and an offset factor, and determining, for each image frame, a reshaping function based on one or more values of each of the plurality of pixels. The method comprises generating an output image for each image frame by applying the rotation matrix, the reshaping function, and the at least one of the scaling factor and the offset factor to the respective image frame. The reshaping function is applied to the respective image frame before the rotation matrix is applied to each pixel of the plurality of pixels for the image frame.

In another exemplary aspect of the present disclosure, there is provided a non-transitory computer-readable medium storing instructions that, when executed by a processor of a video delivery system, cause the video delivery system to perform operations comprising receiving video data, the video data composed of a plurality of image frames, each image frame including a plurality of pixels, determining, for each image frame, a rotation matrix, wherein applying the rotation matrix to each pixel of the plurality of pixels rotates the video data around a chroma-neutral point in a three dimensional color space, determining, for each image frame, at least one of a scaling factor and an offset factor, determining, for each image frame, a reshaping function based on one or more values of each of the plurality of pixels, and generating an output image for each image frame by applying the rotation matrix, the reshaping function, and the at least one of the scaling factor and the offset factor to the respective image frame. The reshaping function is applied to the respective image frame before the rotation matrix is applied to each pixel of the plurality of pixels for the image frame.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which:

FIG. 25 depicts an example block diagram of a reshaping-first compliant decoder.

FIG. 26 depicts an example block diagram of a scene-based encoder.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that these are merely examples. It will further be understood that the disclosed systems and methods can be used in any device in which there is a need to project light; for example, cinema, consumer, and other commercial projection systems, heads-up displays, virtual reality displays, and the like. Disclosed systems and methods may be implemented in additional display devices, such as with an OLED display, an LCD display, a quantum dot display, or the like.

Video Coding of HDR Signals

Figure 1:
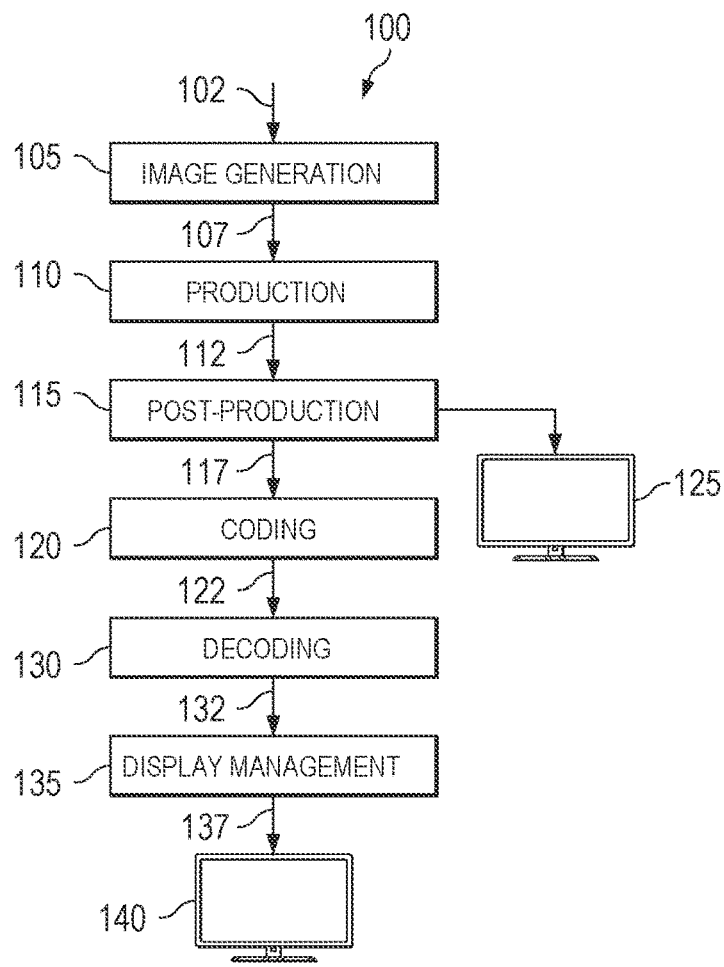
FIG. 1 depicts an example process for a video delivery pipeline.

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor (or one or more processors such as a central processing unit (CPU)) at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). Methods described herein may be performed by the processor at block (120). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Additional methods described herein may be performed by the decoding unit (130) or the display management block (135). Both the decoding unit (130) and the display management block (135) may include their own processor, or may be integrated into a single processing unit.

Three-Dimensional Rotation

A 3D rotation is achieved by applying a real, orthogonal 3×3 matrix. Each row and column represents a unit vector. The principal axis is X, Y, and Z, which are used to define the 3D rotation and 3D space (the Y-axis in this section is not to be confused with the luma (Y) axis). Rotation may be achieved via yaw, pitch, and roll motions. Roll is rotation around the X-axis by angle γ using the following matrix:

$$R_X(\gamma) = \begin{bmatrix} 1 & 0 & 0 \\ 0 & \cos\gamma & -\sin\gamma \\ 0 & \sin\gamma & \cos\gamma \end{bmatrix}$$

Pitch is the rotation around the Y-axis by angle β using the following matrix:

$$R_Y(\beta) = \begin{bmatrix} \cos\beta & 0 & \sin\beta \\ 0 & 1 & 0 \\ -\sin\beta & 0 & \cos\beta \end{bmatrix}$$

Yaw is the rotation around the Z-axis by angle α using the following matrix:

$$R_Z(\alpha) = \begin{bmatrix} \cos\alpha & -\sin\alpha & 0 \\ \sin\alpha & \cos\alpha & 0 \\ 0 & 0 & 1 \end{bmatrix}$$

Rotation around the X-axis can be visualized by rotating a vector from the Y-axis to the Z-axis. Similarly, for rotation around the Z-axis, rotating a vector from the X-axis to the Y-axis indicates a positive Z-direction. On the contrary, for rotation around the Y-axis, rotation must begin with the Z-axis and traverse to the X-axis for a positive Y-direction. Matrix entries described herein may list entries as X, Y, then Z, thus the matrix-entries order is inverted from the standard right-hand convention. The negative sign in the Y-direction indicates this disparity. Therefore, a general rotation matrix is formulated by sequentially rotating around X, Y, and Z-axes. Note this matrix is not commutative (i.e., the order of multiplication is significant). The general rotation matrix is defined by:

$$R(\alpha, \beta, \gamma) = R_Z(\alpha) R_Y(\beta) R_X(\gamma) =$$

$$\begin{bmatrix} \cos\alpha & -\sin\alpha & 0 \\ \sin\alpha & \cos\alpha & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\gamma & -\sin\gamma \\ 0 & \sin\gamma & \cos\gamma \end{bmatrix}$$

$$= \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}$$

Images, however, are rather defined using a color space, such as the YCC color space defined by a luma ("Y") axis (or channel) and two chroma axes (or channels) (for example, YUV, YCbCr, ICtCb, and the like). Using the same concepts as described above, rotation of a vector around both the Cb axis and Cr axis (e.g., the chroma axes) results in a tilt of the Y component. For example, let (y, cb, cr) be the original YCC signal representing some pixel in an image. For 3D rotation of YCC content, the signal is first rotated around the Cb axis by angle $\theta$:

$$R_{Cb}(\theta) = \begin{bmatrix} \cos\theta & 0 & \sin\theta \\ 0 & 1 & 0 \\ -\sin\theta & 0 & \cos\theta \end{bmatrix},$$

followed by rotation around the Cr axis by angle $\varphi$:

$$R_{Cr}(\phi) = \begin{bmatrix} \cos\phi & -\sin\phi & 0 \\ \sin\phi & \cos\phi & 0 \\ 0 & 0 & 1 \end{bmatrix}.$$

Thus, $R_{CbCr}(\theta, \phi)$, the 3×3 rotation matrix in YCC space, is defined by:

$$R_{CbCr}(\theta, \phi) = \begin{bmatrix} \cos\theta\cos\phi & -\sin\phi & \sin\theta\cos\phi \\ \cos\theta\sin\phi & \cos\phi & \sin\theta\sin\phi \\ -\sin\theta & 0 & \cos\theta \end{bmatrix}.$$

Let (y', cb', cr') be the signal after the rotation using $R_{CbCr}(\theta, \phi)$. Accordingly, after rotation, the YCC signal representing some pixel becomes:

$$\begin{bmatrix} y' \\ cb' \\ cr' \end{bmatrix} = R_{Cb,Cr}(\theta, \phi) \begin{bmatrix} y \\ cb \\ cr \end{bmatrix}$$

Additional rotation matrices that serve the same purpose may be contemplated. For example, it is possible to apply a 3×3 diagonal matrix (A) for scaling after the rotation. In such case, the transformation becomes non-unity/affine transformation.

Figure 2:
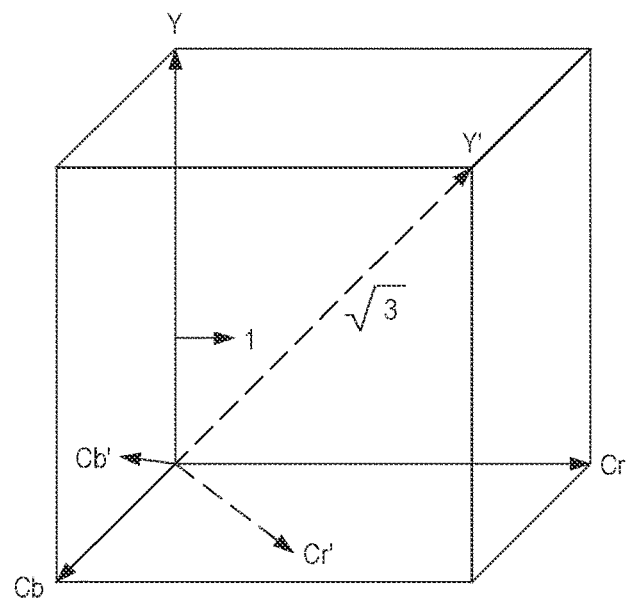
FIG. 2 depicts an example unit cube in a three-dimensional color space.

Tilting the Y (luma) axis provides a model that allows more luma codewords. For example, as shown in FIG. 2, the three color channels Y, Cb, and Cr form a 3D space: a cube of 1-unit side. If 3D rotation is applied such that the original Y-axis is rotated to take the cube-diagonal, it allows $\sqrt{3}$ unit codewords, an increase of approximately 73.2% in luma codewords. As illustrated, this rotation results in the original chroma axes Cb, Cr also being rotated. Thus, a vector specified by its 3 YCC components may go out of, or "clip" out of, the 1-unit cube. This may be addressed by scaling post-rotation, where the rotated vector is scaled to fit in the 1-unit cube, or constraining the rotation angles such that the rotated vector does not go beyond the allowed 1-unit cube space. Both possibilities depend on the input signal and produce a luma codeword increase.

Additional Notation

Let $(v_i^R, v_i^G, v_i^B)$ be the RGB values at pixel i of an original HDR image of bit-depth $\eta_v$. The signal color space may be, for example, R.709 or R.2020. There are total $N_v = 2^{\eta_v}$ HDR codewords e.g. for 16-bit signal, $N_v = 65536$. Let $C_{RGB \to YCC}$ be the 3×3 RGB to YCC conversion matrix for YCbCr full or SMPTE range conversion. Let $(\varsigma_c^Y, \varsigma_c^{Cb}, \varsigma_c^{Cr})$ be the Y, Cb, Cr channel offsets to make it a unsigned $\eta_v$-bit signal. For example, for full-range 16-bit YCbCr signal an offset $(\varsigma_c^Y, \varsigma_c^{Cb}, \varsigma_c^{Cr}) = (0, 32768, 32768)$ is added after 3×3 matrix multiplication to make it unsigned 16-bit values. Thus, $(v_i^Y, v_i^{Cb}, v_i^{Cr})$, the HDR YCC signal at pixel i, that is obtained using color-conversion equation.

Let $(v_{min}^Y, v_{max}^Y)$, $(v_{min}^{Cb}, v_{max}^{Cb})$, $(v_{min}^{Cr}, v_{max}^{Cr})$ be the minimum and maximum signal in Y, Cb, Cr channels respectively. Let $(v_{MIN}^Y, v_{MAX}^Y)$, $(v_{MIN}^{Cb}, v_{MAX}^{Cb})$, $(v_{MIN}^{Cr}, v_{MAX}^{Cr})$ be the minimum and maximum possible values in Y, Cb, Cr channels. For example, for a full-range 16-bit YCC signal, $(v_{MIN}^Y, v_{MAX}^Y) = (v_{MIN}^{Cb}, v_{MAX}^{Cb}) = (v_{MIN}^{Cr}, v_{MAX}^{Cr}) = (0, 65535)$. Generically, we can say $(v_{MIN}^P, v_{MAX}^P)$ be p-axis extremums. Let $v_{RANGE}^P = (v_{MAX}^P - v_{MIN}^P + 1)$ be the allowed number of codewords (or range) in p-axis.

Let $\tilde{s}_i^P$ be the forward-reshaped signal of bit depth $\eta_s$ in the p-axis. There are $N_s = 2^{\eta_s}$ number of BL codewords e.g. for 8-bit BL, $N_s = 256$. Let $T_p^F(.): [0, N_v-1] \to [0, N_s-1]$ be the single-channel forward reshaping function for p-axis signal, where p can be one of original Y, Cb, Cr axis or an axis in the rotated 3D space a,b,c. Similarly, let $T_p^B(.): [0, N_s-1] \to [0, N_v, 1]$ be the backward reshaping function. As a standard practice, $T_p^F(.)$ and $T_p^B(.)$ are required to be monotonically non-decreasing functions. Let $\tilde{v}_i^{(r)p}$ be the reconstructed p-axis HDR signal at the decoder.

Rotation-First Pipeline

Figure 3:
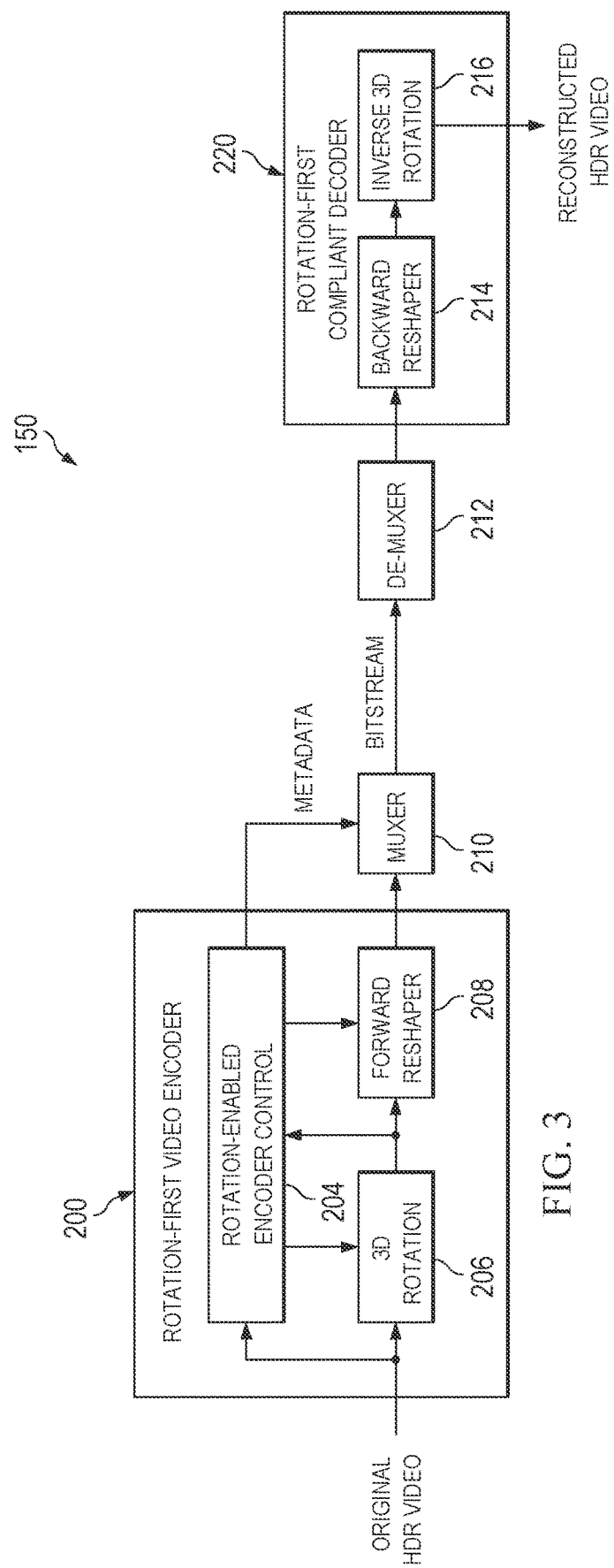
FIG. 3 depicts an example block diagram of a rotation-first encoding/decoding pipeline.

Two primary operations occur at the encoder (e.g., the encoding block (120)): The 3D rotation to the color space, and reshaping the HDR video data to a lower bit-depth. The order of these are interchangeable, but changing the order may change the encoding process. FIG. 3 illustrates a block diagram of a rotation-first pipeline (150). The rotation-first pipeline (150) includes a rotation-first video encoder (200), a rotation-first compliant decoder (220), a multiplexer (or muxer) (210), and a de-multiplexer (or de-muxer) (212). The rotation-first video encoder (200) includes a rotation-enabled encoder controller (204), a 3D rotation block (206), and a forward reshaping block (208). When the rotation-first video encoder (200) receives the HDR video data, the HDR video data is provided to both the 3D rotation block (206) and the rotation-enabled encoder controller (204). The rotation-enabled encoder controller (204) sets parameters for the 3D rotation block (206) and the forward reshaping (208), such as the rotation matrix, the scaling matrix, offsets, and reshaping functions, as described in more detail below. The output of the forward reshaping (208) and metadata created by the rotation-enabled encoder controller (204) are combined at the multiplexer (210) to form an encoded bitstream, such as coded bit stream (122). In some implementations, the multiplexer (210) is part of the rotation-first video encoder 202. The de-multiplexer (212) receives the encoded bitstream and separates the metadata from the video data (e.g., the output of the forward reshaping (208)). The metadata and the video data are provided to the rotation-first compliant decoder (220). The rotation-first compliant decoder (220) includes a backward reshaping block (214) and an inverse 3D rotation block (216). The rotation-first compliant decoder (220) reconstructs the HDR video data from the received metadata and video data. The rotation-first pipeline (150) may also include more or less blocks. Additionally, the blocks are merely illustrative, and may be combined or separated.

Figure 4:
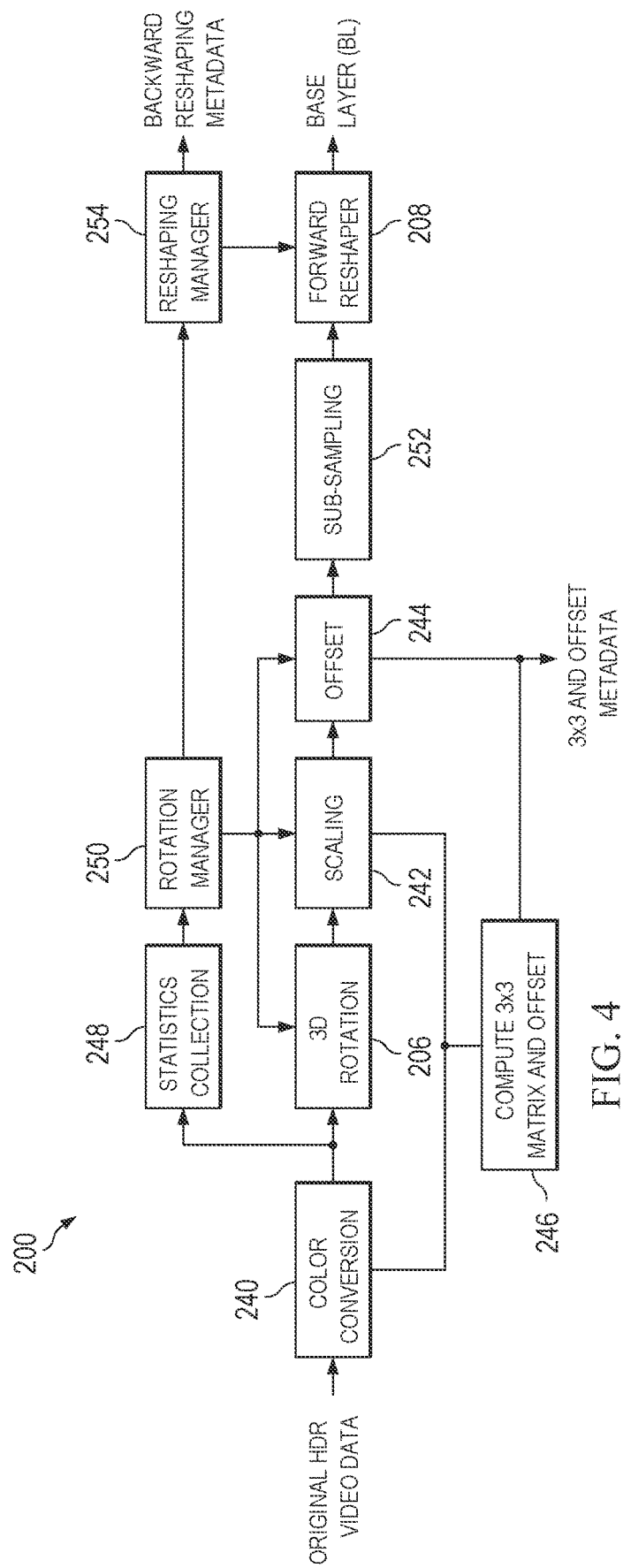
FIG. 4 depicts an example block diagram of a rotation-first encoder.

FIG. 4 illustrates a block diagram of the rotation-first video encoder (200) in another embodiment. In addition to the 3D rotation block (206) and the forward reshaping block (208), the rotation-first video encoder (200) includes a color conversion block (240), a scaling block (242), and offset block (244), a computing matrix and offset block (246), a statistics collection block (248), a rotation manager block (250), a subsampling block (252), and a reshaping manager block (254). The rotation-first video encoder (200) may include more or less operational blocks than shown. Additionally, the blocks are merely illustrative, and may be combined or separated.

The HDR video data is video data consisting of a plurality of image frames. The rotation-first video encoder (200) may process each image frame individually, or may process several image frames at once. The color conversion block (240) converts the original HDR video data from a first color space to a second color space. For example, if the HDR video data is in the RGB color domain, the color conversion block (240) may convert the HDR video data to the YCbCr color domain. The video data at pixel i, $(v_i^R, v_i^G, v_i^B)$ is converted to YCbCr values $(v_i^Y, v_i^{Cb}, v_i^{Cr})$ using the following equation:

$$\begin{bmatrix} v_i^Y \\ v_i^{Cb} \\ v_i^{Cr} \end{bmatrix} = C_{RGB \to YCC} \begin{bmatrix} v_i^R \\ v_i^G \\ v_i^B \end{bmatrix} + \begin{bmatrix} s_C^Y \\ s_C^{Cb} \\ s_C^{Cr} \end{bmatrix}$$

Accordingly, the output of the color conversion block (240) is a YCC-domain signal. However, in some implementations, the received HDR video data may already be in the desired color space, and the color conversion block (240) may then be absent. The 3D rotation block (206) performs 3×3 matrix rotation on the YCC-domain signal using $R_{CbCr}$ (θ, ϕ) around the chroma-neutral point. For example, let the resulting signal at pixel i be $(\tilde{v}_i^a, \tilde{v}_i^b, \tilde{v}_i^c)$ in some abc-space.

$$\begin{bmatrix} \tilde{v}_i^a \\ \tilde{v}_i^b \\ \tilde{v}_i^c \end{bmatrix} = R_{CbCr}(\theta, \phi) \left( \begin{bmatrix} v_i^Y \\ v_i^{Cb} \\ v_i^{Cr} \end{bmatrix} - \begin{bmatrix} s_C^Y \\ s_C^{Cb} \\ s_C^{Cr} \end{bmatrix} \right)$$

In some implementations, θ=−36.5° and ϕ=45° to achieve maximum luma codeword gain. This 3×3 operation tilts the Y-axis (luminance axis) to take the unit-cube's solid diagonal of length $\sqrt{3}$ units. The chroma neutral point may be a point in the color space (e.g. the YCC-domain) with first and second chroma values corresponding to the middle values of the full (possible) ranges of the chroma axes (e.g. Cr and Cb). For example, a chroma neutral point may be expressed as $$\begin{bmatrix} g \\ 2^{\eta_v - 1} \\ 2^{\eta_v - 1} \end{bmatrix},$$

where e.g. g=0. While the 3×3 matrix rotation is primarily referred to as rotation around the chroma-neutral point, the 3×3 matrix rotation may instead be around any point in 3D space in which the rotation is revertible.

The 3×3 rotation may cause the signal at any of the image pixels to go out of the unit-cube. The scaling block (242) and the offset block (244) make the pre-reshaping signal at each pixel between $[v_{MIN}^p, v_{MAX}^p]$. For example, let the scaling factors be $(\lambda_a, \lambda_b, \lambda_c)$ and the signal after scaling be $(\bar{v}_i^a, \bar{v}_i^b, \bar{v}_i^c)$:

$$\begin{bmatrix} \bar{v}_i^a \\ \bar{v}_i^b \\ \bar{v}_i^c \end{bmatrix} = \Lambda^{abc} \begin{bmatrix} \tilde{v}_i^a \\ \tilde{v}_i^b \\ \tilde{v}_i^c \end{bmatrix}, \text{ where } \Lambda^{abc} = \begin{bmatrix} \lambda_a & 0 & 0 \\ 0 & \lambda_b & 0 \\ 0 & 0 & \lambda_c \end{bmatrix}$$

Let the additive offsets be denoted by $(\varsigma_a, \varsigma_b, \varsigma_c)$. They are constant for all pixels in image. The resulting HDR signal before forward reshaping at pixel i is $(v_i^a, v_i^b, v_i^c)$:

$$\begin{bmatrix} v_i^a \\ v_i^b \\ v_i^c \end{bmatrix} = \begin{bmatrix} \bar{v}_i^a \\ \bar{v}_i^b \\ \bar{v}_i^c \end{bmatrix} + \varsigma, \text{ where } \varsigma = \begin{bmatrix} \varsigma_a \\ \varsigma_b \\ \varsigma_c \end{bmatrix}$$

The scaling matrix $\Lambda^{abc}$ and the offset $\varsigma$ may be determined by the rotation manager block (250), as described in more detail below.

The subsampling block (252) receives the transformed HDR video data and down-samples the data using a as analogous to the luma axis and b & c to Cb and Cr axes. The transformed video data may be down-sampled to 4:2:0 (or, in some implementations, 4:2:2) format. However, in some implementations, the transformed HDR video data may directly be coded in 4:4:4 format, and the subsampling block (252) may be absent or may simply pass the transformed HDR video data.

The $\eta_v$-bit HDR video data is then forward reshaped using $T_a^F(.), T_b^F(.), T_c^F(.)$, a set of functions determined at the encoder (such as by the rotation manager block (250) and/or the reshaping manager block (254)) to the $\eta_s$-bit base layer (BL):

$$s_i^p = T_p^F(v_i^p),$$

for each pixel i in the image, for all three axes p=a,b,c. The BL signal may undergo standard-compliant compression (e.g., AVC) to form compressed base layer. The reshaping manager (254) determines the forward and backward reshaping functions, as described in more detail below.

The HDR video data after rotation (and before forward reshaping) needs to be up $v_i^p \in [0, N_v - 1]$ in each p-axis for all pixels i of the image. In other words, the rotated-domain signal needs to be represented as $\eta_v$-bit number to avoid signal clipping. Checking for clipping at each pixel during 3D rotation, scaling, and offset is computationally expensive. Rather, a luma (or Y-) slice-based approach is used using the statistics collection block (248). Using a luma slice-based approach creates a 3D-envelope containing the entire signal.

For example, let the HDR Y-signal range ($v_{MIN}^Y$, $v_{MAX}^Y$) be divided into $\pi^Y$ number of codeword-ranges or "bins", indexed using b, each containing equal luma codewords. The number of codewords in each bin is $$N_b^Y = \frac{(v_{MAX}^Y - v_{MIN}^Y + 1)}{\pi^Y}.$$

For example, 16-bit full-range luma signal has ($v_{MIN}^Y$, $v_{MAX}^Y$)=(0.65535), number of bins $\pi^Y$=64, $$N_b^Y = \frac{65536}{64} = 1024$$

codewords per bin. Additionally, let $v_{b,mid}^Y$ denote the center value of luma intensity in b'th luma bin:

$$v_{b,mid}^Y = \left(b + \frac{1}{2}\right) \cdot N_b^Y,$$

where b∈[0, 1, ... $\pi^Y$−1].

Next, at pixel i, the statistics collection block (248) computes the luma-bin index $$b_i = \left\lfloor \frac{v_i^Y}{N_b^Y} \right\rfloor$$

where $b_i$∈[0, 1, ... $\pi^Y$−1] and $\lfloor . \rfloor$ is floor operation. After all pixels in the image are processed, "non-empty" bins are recorded such that they have non-zero pixels. Let γ be the set of $N_\gamma$ non-empty bins, $N_\gamma \leq \pi^Y$. These bins $\gamma_d \in \gamma$, d=0, 1, ... $N_\gamma$−1 assist in determining the signal envelope.

Figure 5:
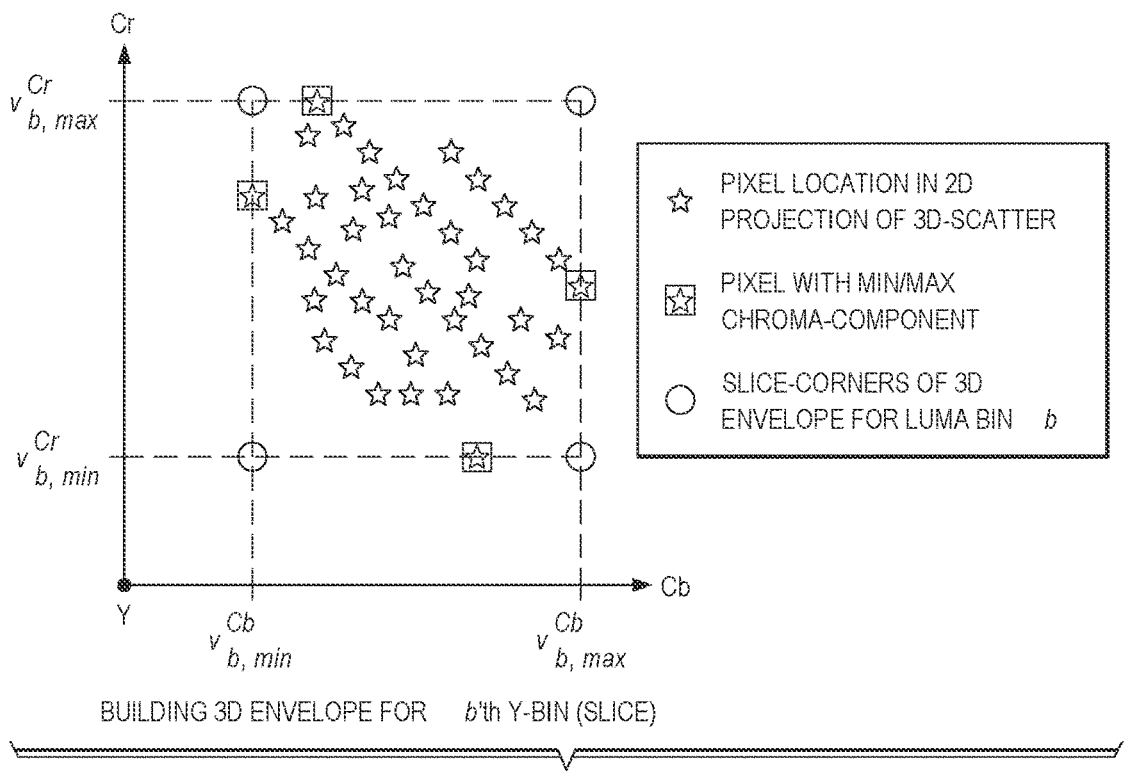
FIG. 5 depicts an example two-dimensional plot of a 3D-envelope using 2D luma-slice corners.

FIG. 5 illustrates a 3D envelope using 2D luma-slice corners. In FIG. 5, ($v_{b,min}^{Cb}$, $v_{b,max}^{Cb}$) are the minimum and maximum pixel value in the Cb channel in b'th luma bin, and ($v_{b,min}^{Cr}$, $v_{b,max}^{Cr}$) are the minimum and maximum pixel value in the Cr channel in b'th luma bin. The extent of the signal in the bin are defined by ($v_{b,mid}^Y$, $v_{b,min}^{Cb}$, $v_{b,min}^{Cr}$), ($v_{b,mid}^Y$, $v_{b,min}^{Cb}$, $v_{b,max}^{Cr}$), ($v_{b,mid}^Y$, $v_{b,max}^{Cb}$, $v_{b,min}^{Cr}$) and ($v_{b,mid}^Y$, $v_{b,max}^{Cb}$, $v_{b,max}^{Cr}$) in b'th luma bin. The pixel locations from luma bin b are marked with asterisk. The Cb and Cr minimum and maximum values serve as corners of the 2D slice ensuring the signal is contained within this rectangle.

Figure 6:
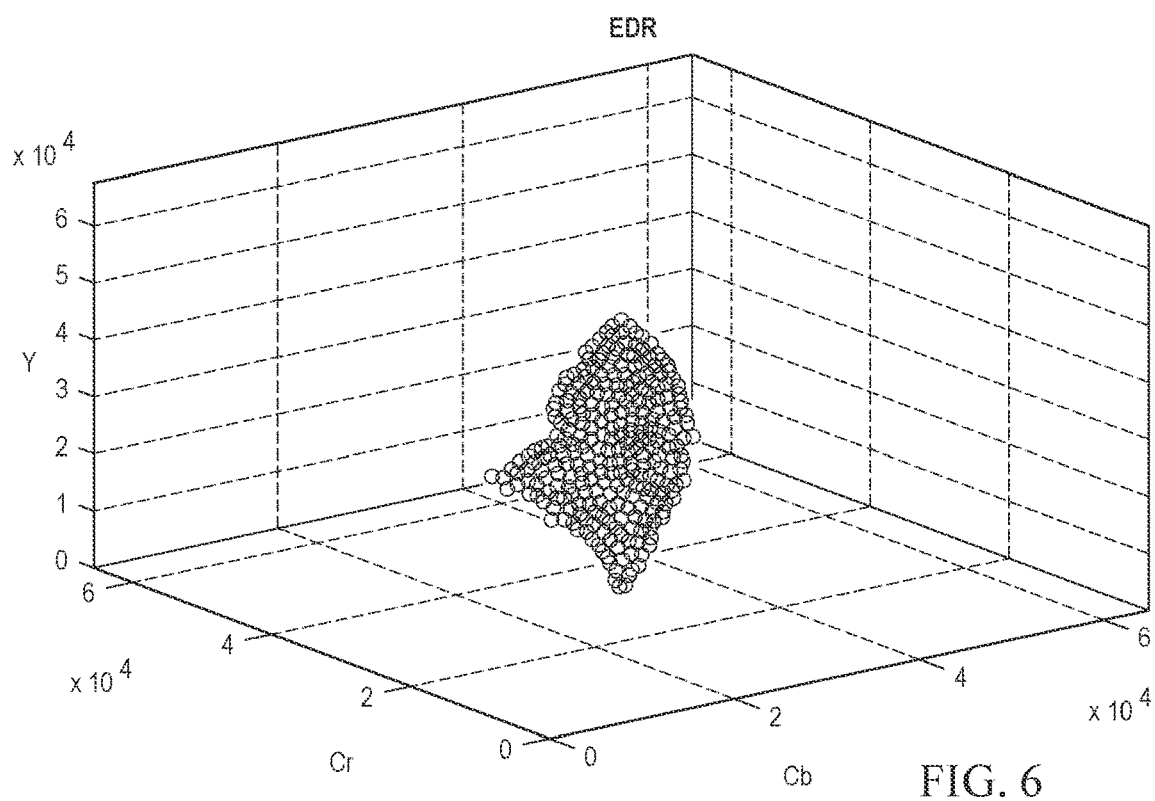
FIG. 6 depicts an example three-dimensional scatter plot of pixels from the original HDR frame.
Figure 7:
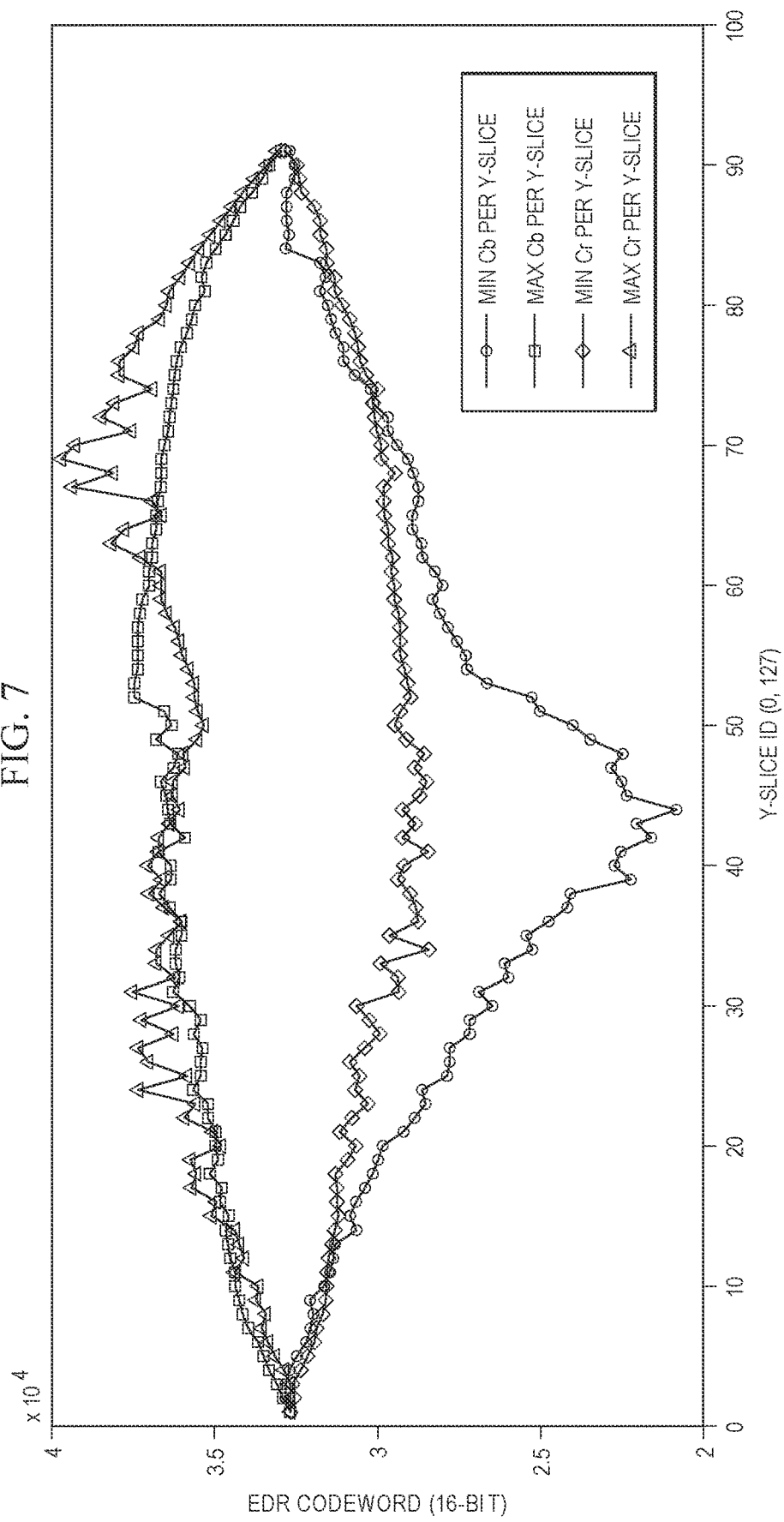
FIG. 7 depicts an example two-dimensional graph of chroma minimum and maximum points for each luma-slice.

Next, the statistics collection block (248) takes the above 4 samples from all non-empty bins to get a bounding rectangle for each bin. This forms the 3D-envelope of the input HDR YCbCr signal, ensuring the entire signal is contained in it. FIG. 6 illustrates a scatter of all pixels within an image. The entire image is contained within a fraction of the 3D space. FIG. 7 illustrates chroma minimum and maximum Cb and Cr values for each luma bin or luma slice that are used to construct the 3D envelope.

Returning to FIG. 4, the rotation manager block (250) determines the scaling factor and offsets (such as scaling matrix $\Lambda^{abc}$ and the offset ς) for each image frame in the HDR video data using the collected statistics from the statistics collection block (248). First, a matrix $V^{Env}$ is formed of all 3D-envelope samples:

$$V^{Env} = \begin{bmatrix} v_{\gamma_0,mid}^Y & v_{\gamma_0,mid}^Y & v_{\gamma_0,mid}^Y & v_{\gamma_0,mid}^Y & \cdots & v_{\gamma_{N_\gamma-1},mid}^Y & v_{\gamma_{N_\gamma-1},mid}^Y & v_{\gamma_{N_\gamma-1},mid}^Y & v_{\gamma_{N_\gamma-1},mid}^Y \\ v_{\gamma_0,min}^{Cb} & v_{\gamma_0,min}^{Cb} & v_{\gamma_0,max}^{Cb} & v_{\gamma_0,max}^{Cb} & \cdots & v_{\gamma_{N_\gamma-1},min}^{Cb} & v_{\gamma_{N_\gamma-1},min}^{Cb} & v_{\gamma_{N_\gamma-1},max}^{Cb} & v_{\gamma_{N_\gamma-1},max}^{Cb} \\ v_{\gamma_0,min}^{Cr} & v_{\gamma_0,max}^{Cr} & v_{\gamma_0,min}^{Cr} & v_{\gamma_0,max}^{Cr} & \cdots & v_{\gamma_{N_\gamma-1},min}^{Cr} & v_{\gamma_{N_\gamma-1},max}^{Cr} & v_{\gamma_{N_\gamma-1},min}^{Cr} & v_{\gamma_{N_\gamma-1},max}^{Cr} \end{bmatrix}$$

where each column represents a point on the 3D envelope.

Since there are four 3D entries per slice and total $N_\gamma$ slices, the matrix is of size: (3×4$N_\gamma$). Next, a 3×3 rotation is applied around the chroma-neutral point, only to the 3D-envelope samples $V^{Env}$ to obtain $\ddot{V}^{Env}$:

$$\ddot{V}^{Env} = R_{Cb,Cr}(\theta, \phi)\left(V^{Env} - \begin{bmatrix} s_C^Y \\ s_C^{Cb} \\ s_C^{Cr} \end{bmatrix}\right)$$

Entries of $\ddot{V}^{Env}$ matrix are in rotated-domain abc. The minimum and maximum values in each axis a,c,b are computed by the rotation manager block (250) as ($\ddot{v}_{min}^{Env,p}$, $\ddot{v}_{max}^{Env,p}$).p={a, b, c}. The $v_{MIN}^p$-clipped codeword-range $\ddot{v}_{range}^{Env,p}$, in axis p is computed as:

$$\ddot{v}_{range}^{Env,p} = \ddot{v}_{max}^{Env,p} - \min(\ddot{v}_{min}^{Env,p}, v_{MIN}^p)$$

If the signal range is greater than the allowed range allowed range ($v_{RANGE}^p$), the axis is scaled using the factor $\lambda_p$. Thus:

$$\lambda_p = \min\left(\frac{v_{RANGE}^p}{\ddot{v}_{range}^{Env,p}}, 1\right)$$

Computing for all three axis, the rotation manager block (250) constructs a diagonal matrix $\Lambda^{abc}$ for scaling:

$$\Lambda^{abc} = \begin{bmatrix} \lambda_a & 0 & 0 \\ 0 & \lambda_b & 0 \\ 0 & 0 & \lambda_c \end{bmatrix}$$

Applying the scaling matrix to $\ddot{V}^{Env}$ results in $\check{V}^{Env}$:

$$\check{V}^{Env} = \Lambda^{abc} \ddot{V}^{Env}$$

After scaling, the amount of positive offset ($\varsigma_p$) is computed to make the signal value between $[v_{MIN}^p, v_{MAX}^p]$. $\check{v}_{min}^{Env,p}$, the minimum value from $\check{V}^{Env}$ in p axis, is used to determine $\varsigma_p$:

$$\varsigma_p = \max(v_{MIN}^p - \bar{v}_{min}^{Env,p}, 0)$$

Figure 8:
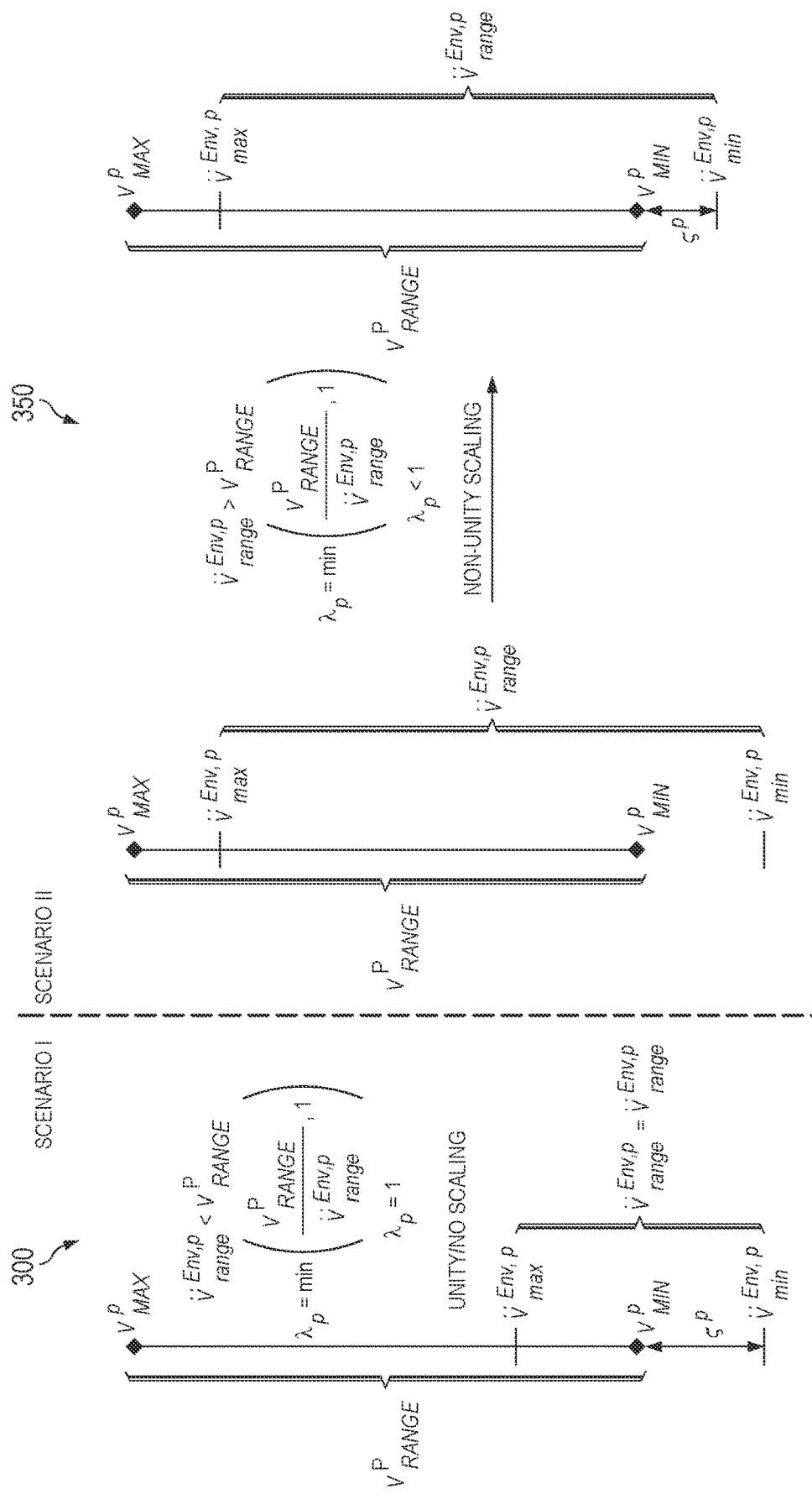
FIG. 8 depicts example scaling and offset algorithms.

FIG. 8 illustrates a first scenario (300) and a second scenario (350) for the scaling and offset computations. In the first scenario (300), the rotated signal range is less than the allowed signal range: $\check{v}_{range}^{Env,p} \leq v_{RANGE}^p$. Therefore, scaling is not needed, and applying only offset addition to make the signal-minimum $\geq v_{MIN}^p$ is sufficient. Thus, in the first scenario (300), the scaling factor is equal to 1. In the second scenario (350), the signal range is beyond the allowed signal range: $\check{v}_{range}^{Env,p} > v_{RANGE}^p$. Thus, only adding an offset will make some part of signal clip. First, the signal range should be reduced such that each pixel value is multiplied by $$\lambda_p = \frac{v_{RANGE}^p}{\check{v}_{range}^{Env,p}}.$$

Here, $\lambda_p > 1$ makes the signal shrink its range

In summary, at the rotation-first video encoder (200), the input HDR video data (when in the RGB color space) is transformed into the abc space according to:

$$\begin{bmatrix} v_i^a \\ v_i^b \\ v_i^c \end{bmatrix} = \begin{bmatrix} \bar{v}_i^a \\ \bar{v}_i^b \\ \bar{v}_i^c \end{bmatrix} + \begin{bmatrix} \varsigma_a \\ \varsigma_b \\ \varsigma_c \end{bmatrix} =$$

$$\Lambda^{abc} \begin{bmatrix} \bar{v}_i^a \\ \bar{v}_i^b \\ \bar{v}_i^c \end{bmatrix} + \begin{bmatrix} \varsigma_a \\ \varsigma_b \\ \varsigma_c \end{bmatrix} = \Lambda^{abc} R_{CbCr}(\theta, \phi) \left( \begin{bmatrix} v_i^Y \\ v_i^{Cb} \\ v_i^{Cr} \end{bmatrix} - \begin{bmatrix} s_C^Y \\ s_C^{Cb} \\ s_C^{Cr} \end{bmatrix} \right) + \begin{bmatrix} \varsigma_a \\ \varsigma_b \\ \varsigma_c \end{bmatrix} =$$

$$\Lambda^{abc} R_{CbCr}(\theta, \phi) \left( C_{RGB \to YCC} \begin{bmatrix} v_i^R \\ v_i^G \\ v_i^B \end{bmatrix} + \begin{bmatrix} s_C^Y \\ s_C^{Cb} \\ s_C^{Cr} \end{bmatrix} - \begin{bmatrix} s_C^Y \\ s_C^{Cb} \\ s_C^{Cr} \end{bmatrix} \right) + \begin{bmatrix} \varsigma_a \\ \varsigma_b \\ \varsigma_c \end{bmatrix} =$$

$$\Lambda^{abc} R_{CbCr}(\theta, \phi) C_{RGB \to YCC} \begin{bmatrix} v_i^R \\ v_i^G \\ v_i^B \end{bmatrix} + \begin{bmatrix} \varsigma_a \\ \varsigma_b \\ \varsigma_c \end{bmatrix}$$

At the rotation-first video decoder (220), the reconstructed signal ($\tilde{v}_i^{(r)a}, \tilde{v}_i^{(r)b}, \tilde{v}_i^{(r)c}$) needs to be converted back to RGB color space, using inverse operations. Accordingly, let ($\tilde{v}_i^{(r)R}, \tilde{v}_i^{(r)G}, \tilde{v}_i^{(r)B}$) be the resulting reconstructed RGB signal at the decoder:

$$\begin{bmatrix} \tilde{v}_i^{(r)R} \\ \tilde{v}_i^{(r)G} \\ \tilde{v}_i^{(r)B} \end{bmatrix} = M \begin{bmatrix} \tilde{v}_i^{(r)a} \\ \tilde{v}_i^{(r)b} \\ \tilde{v}_i^{(r)c} \end{bmatrix} - \begin{bmatrix} \varsigma_a \\ \varsigma_b \\ \varsigma_c \end{bmatrix},$$

where $\varsigma = (\varsigma_a, \varsigma_b, \varsigma_c)$ and $M = (C_{RGB \to YCC})^{-1} (R_{CbCr}(\theta, \phi))^{-1} (\Lambda^{abc})^{-1}$ are the metadata offset and matrix respectively, which are determined by the computing matrix and offset block (246) and the offset block (244).

The reshaping manager block (254) determines the reshaping functions $T_p^F(.)$ and $T_p^B(.)$ for p=a,b,c channels. The HDR video data is between $[\check{v}_{min}^{Env,a}, \check{v}_{max}^{Env,a}]$ The a channel is treated as a luma channel, while b and c are treated like chroma channels. For the luma channel a, a first-order (line) function for forward reshaping is used: $[\check{v}_{min}^{Env,a}, \check{v}_{max}^{Env,a}] \to [0, N_s-1]$, utilizing all $N_s$ codewords of BL in channel a. Thus, some HDR codeword v is transferred to s as defined by the forward reshaping function:

$$s = T_a^F(v) = \begin{cases} 0 & \text{for } v < \bar{v}_{min}^{Env,a} \\ \text{round}\left[\left(\frac{N_s - 1}{\bar{v}_{max}^{Env,a} - \bar{v}_{min}^{Env,a}}\right)(v - \bar{v}_{min}^{Env,a})\right] & \text{for } \bar{v}_{min}^{Env,a} \leq v \leq \bar{v}_{max}^{Env,a} \\ N_s - 1 & \text{for } v > \bar{v}_{max}^{Env,a} \end{cases}$$

where round [.] is the rounding operation.

The forward reshaping function $T_a^F(.)$ can then be inverted to construct the backward reshaping function $T_a^B(.)$. For BL codeword s, $\hat{v}$ can be reconstructed using the following:

$$\hat{v} = T_a^B(s) = \bar{v}_{min}^{Env,a} + \text{round}\left[\left(\frac{\bar{v}_{max}^{Env,a} - \bar{v}_{min}^{Env,a}}{N_s - 1}\right)s\right]$$

Figure 9A:
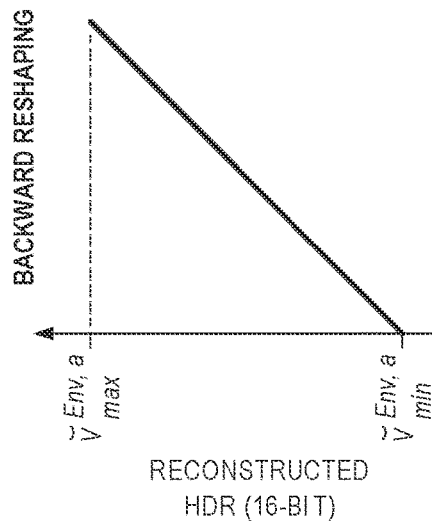
FIGS. 9A-9B depict example graphs of example luma reshaping functions.
Figure 9B:
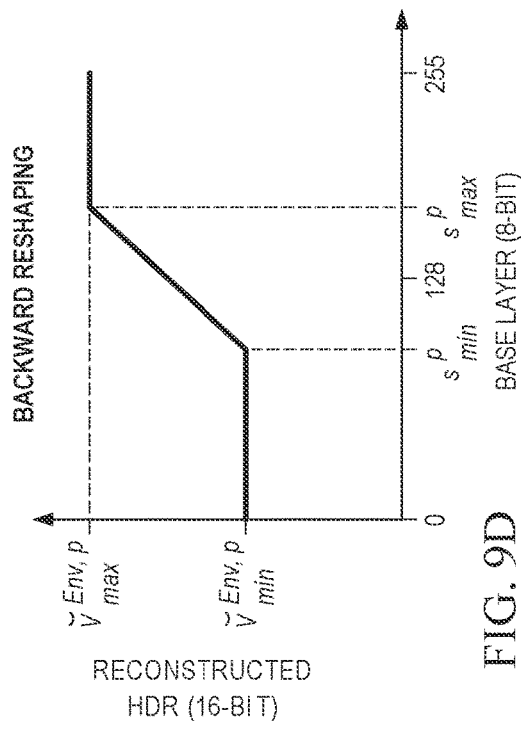

FIGS. 9A and 9B illustrate examples of 16-bit HDR luma reshaping to and from 8-bit base layer signal via forward and backward transfer functions, respectively. For chroma channels p=b or c, a luma-weighted reshaping is used. One example of a luma-weighted reshaping is provided in U.S. Pat. No. 9,497,456, "Layer Decomposition in Hierarchical VDR Coding," by G. Su, S. Qu, S. Hulyalkar, T. Chen, W. Gish, and H. Koepfer, which is incorporated herein by reference in its entirety. This facilitates assigning more importance to reshaped luma content than that of chroma content, aiding typically video compression to spend more bits on the visually more-significant luma part.

The reshaping manager block (254) determines the range of BL codewords to be used for channel p, based on the ratio of HDR chroma range to luma range. For example, the number of BL codewords used may be provided by:

$$s_{range}^p = \min\left(\text{round}\left[N_s\left(\frac{\bar{v}_{max}^{Env,p} - \bar{v}_{min}^{Env,p}}{\bar{v}_{max}^{Env,a} - \bar{v}_{min}^{Env,a}}\right)\right], N_s\right)$$

The chroma-neutral point is shifted to the center of BL axis such that the minimum and maximum reshaped BL codewords $s_{min}^p, s_{max}^p$ are:

$$s_{min}^p = \text{round}\left[\frac{N_S}{2} - \frac{s_{range}^p}{2}\right]$$

and $$s_{max}^p = \text{round}\left[\frac{N_S}{2} + \frac{s_{range}^p}{2}\right]$$

Thus, the chroma forward reshaping for channel p:

$$s = T_p^F(v) = \begin{cases} s_{min}^p & \text{for } v < \tilde{v}_{min}^{Env,p} \\ s_{min}^p + \text{round}\left[\left(\dfrac{s_{range}^p}{\tilde{v}_{max}^{Env,p} - \tilde{v}_{min}^{Env,p}}\right)\left(v - \tilde{v}_{min}^{Env,p}\right)\right] & \text{for } \tilde{v}_{min}^{Env,p} \le v \le \tilde{v}_{max}^{Env,p} \\ s_{max}^p & \text{for } v > \tilde{v}_{max}^{Env,p} \end{cases}$$

and the corresponding backward reshaping function is:

$$\hat{v} = T_p^B(s) = \tilde{v}_{min}^{Env,p} + \text{round}\left[\left(\dfrac{\tilde{v}_{max}^{Env,p} - \tilde{v}_{min}^{Env,p}}{s_{range}^p}\right)(s - s_{min}^p)\right]$$

Figure 9C:
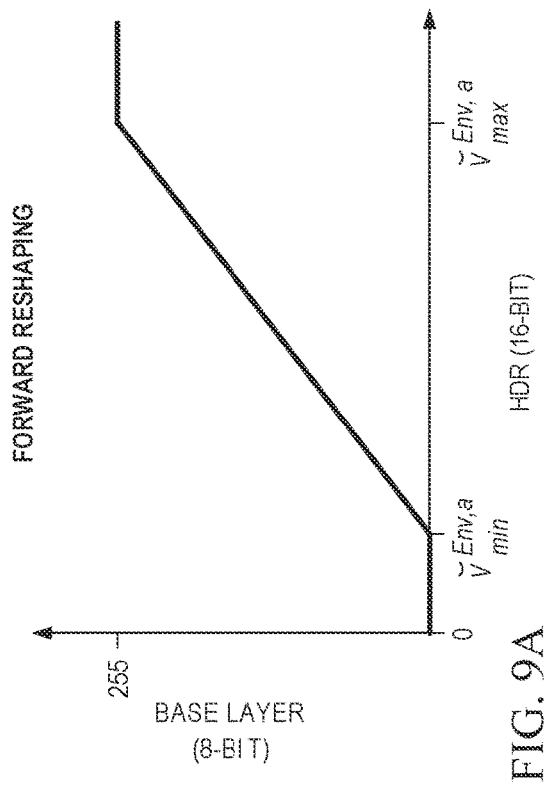
FIGS. 9C-9D depict example graphs of example chroma reshaping functions.
Figure 9D:
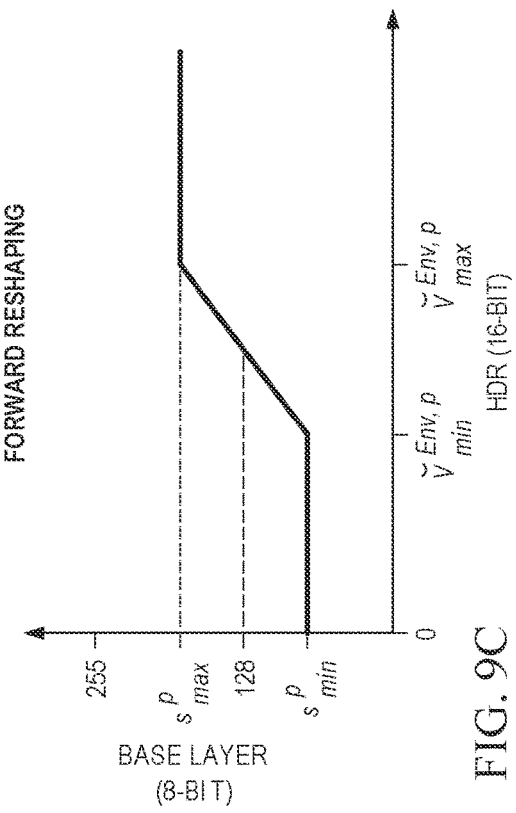

FIGS. 9C and 9D provide example reshaping functions for the chroma channels p=b or c. Note that the reshaped chroma may not utilize the entire BL codeword range. The backward reshaping parameters may be expressed as luma and chroma first order polynomials.

Figure 10:
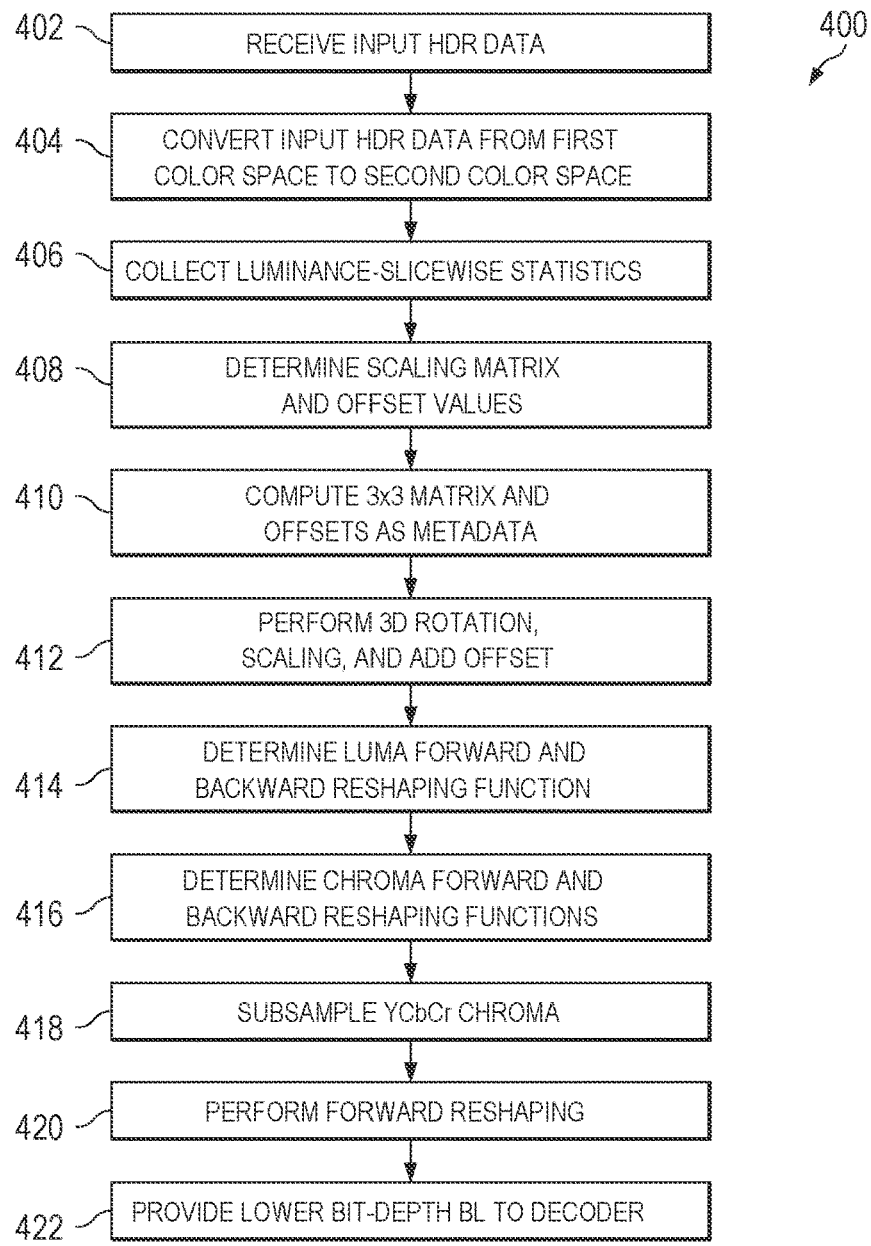
FIG. 10 depicts an example block diagram of a method performed by the rotation-first encoder of FIG. 4.

FIG. 10 provides a method (400) that details the operations of the rotation-first video encoder (200). At block (402), the rotation-first video encoder (200) receives the input HDR video data (or a single input HDR image), such as final production (117). At block (404) the rotation-first video encoder (200) converts the input HDR video data from a first color space to a second color space, such as from RGB to YCC.

At block (406), the rotation-first video encoder (200) collects luminance-slicewise statistics using the statistics collection block (248). At block (408), the rotation-first video encoder (200) determines the scaling matrix and offset values using the rotation manager block (250). At block (410), the rotation-first video encoder (200) computes the 3×3 matrix and offsets as metadata, using the computing matrix and offset block (246). At block (412), the rotation-first video encoder (200) performs the 3D rotation, scaling, and offset functions using the 3D rotation block (206), the scaling block (242), and the offset block (244), respectively.

At block (414), the rotation-first video encoder (200) determines the luma forward and backward reshaping functions using the reshaping manager (254). At block (416), the rotation-first video encoder (200) determines the chroma forward and backward reshaping functions using the reshaping manager (254). At block (418), the rotation-first video encoder (200) subsamples the YCC chroma using the subsampling block (252). At block (420), the rotation-first video encoder (200) performs the forward reshaping function using the forward reshaping block (208). At block (422), the rotation-first video encoder (200) provides the lower bit-depth BL to the rotation-first video decoder (220).

Figure 11:
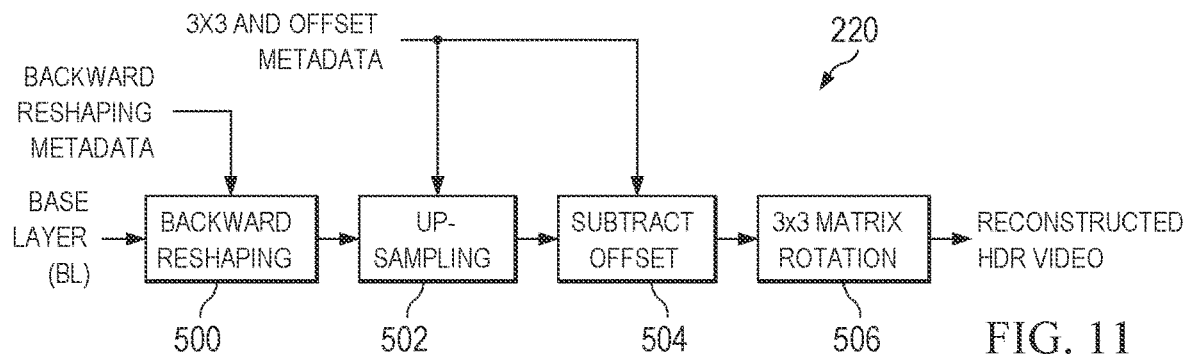
FIG. 11 depicts an example block diagram of a rotation-first compliant decoder.

FIG. 11 illustrates a block diagram of the rotation-first video decoder (220). The rotation-first video decoder (220) includes a backward reshaping block (500), an up-sampling block (502), a subtract offset block (504), and a 3×3 matrix rotation block (506). However, the rotation-first video decoder (220) may also have more or less operational blocks.

The decompressed BL and reshaping metadata are used to reconstruct the HDR signal. If the signal is in 4:2:0 format, the up-sampling block (502) performs 4:4:4 up-sampling to make the three planes of equal size. The rotation-first video decoder (220) then subtracts the offset from the signal and performs 3×3 matrix rotation to reconstruct the initial HDR signal.

Reshaping-First Pipeline

Figures 12, 13:
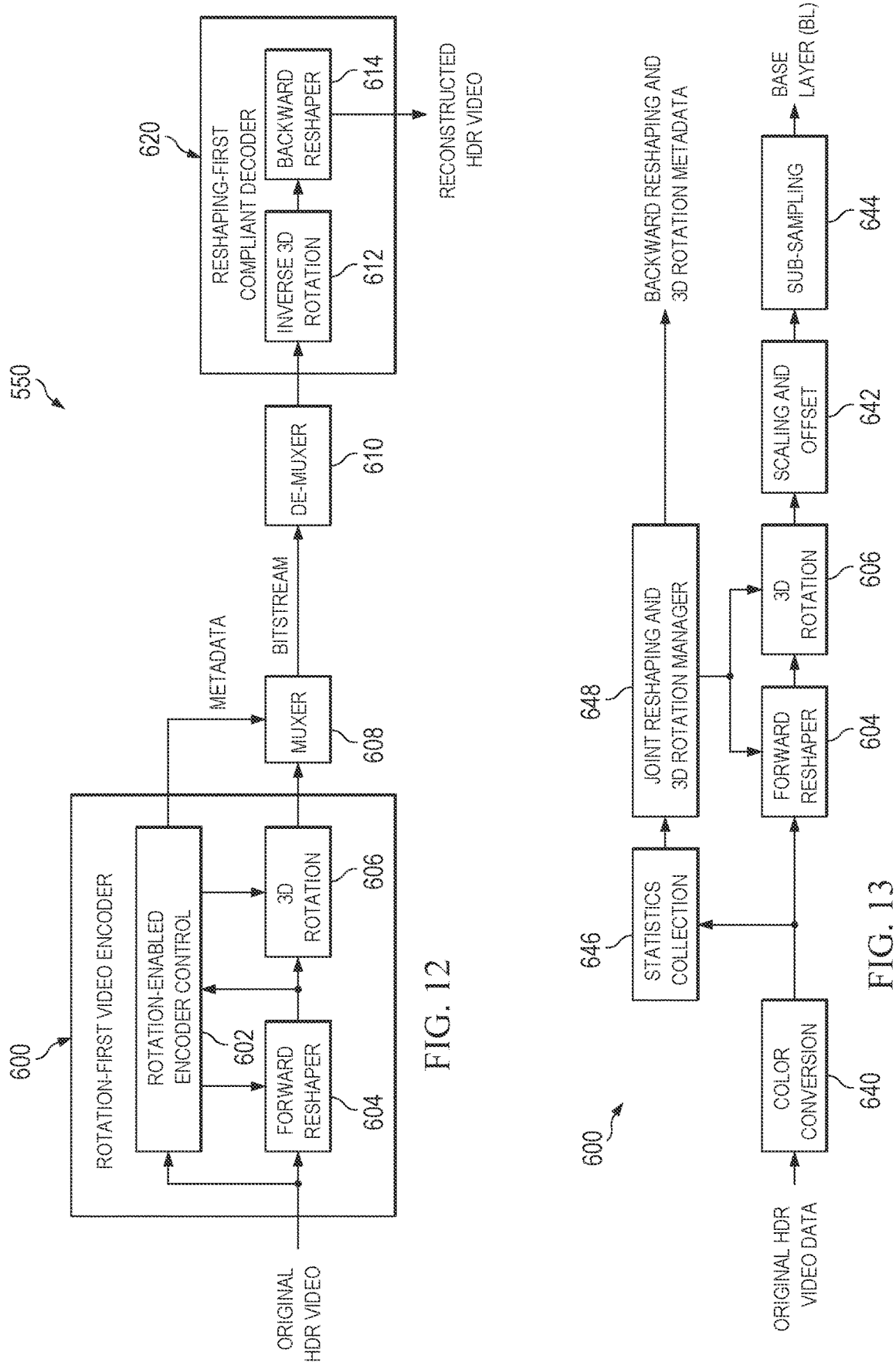
FIG. 12 depicts an example block diagram of a reshaping-first encoding/decoding pipeline
FIG. 13 depicts an example block diagram of a reshaping-first encoder.

As previously described, the order of the 3D rotation and reshaping of the video data are interchangeable, but changing the order may change the encoding process. FIG. 12 illustrates a block diagram of a reshaping-first pipeline (550). The reshaping-first pipeline (550) includes a reshaping-first video encoder (600), a reshaping-first video decoder (620), a mixer (608), and a de-mixer (610). The reshaping-first video encoder (600) includes a rotation-enabled encoder controller (602), a forward reshaping block (604), and a 3D rotation block (606). When the rotation-first video encoder (600) receives the HDR video data, the HDR video data is provided to both the forward reshaping block (604) and the rotation-enabled encoder controller (602). The output of the 3D rotation block (606) and metadata created by the rotation-enabled encoder controller (602) are combined at the mixer (608) to form an encoded bitstream, such as coded bit stream (122). In some implementations, the mixer (608) is part of the rotation-first video encoder (202). The de-mixer (610) receives the encoded bitstream and separates the metadata from the video data (e.g., the output of the 3D rotation block (606)). The metadata and the video data are provided to the reshaping-first video decoder (620). The reshaping-first video decoder (620) includes an inverse 3D rotation block (612) and a backward reshaping block (614). The reshaping-first video decoder (620) reconstructs the HDR video data from the received metadata and video data. The reshaping-first pipeline (550) may include more or less operational blocks than shown. Additionally, the blocks are merely illustrative, and may be combined or separated.

The reshaping-first video encoder (600) first forward-reshapes the HDR content to a lower bit-depth base layer, followed by a 3D rotation. Here, the reshaping and rotation parameters are jointly determined by the rotation-enabled encoder controller (602). The mixed bitstream consists of the backward reshaping and inverse rotation parameters. The reshaping-first video decoder (620) first performs 3×3 matrix rotation, followed by backward reshaping to reconstruct the HDR signal.

FIG. 13 illustrates a block diagram of the reshaping-first video encoder (600) in another embodiment. In addition to the forward reshaping block (604) and the 3D rotation block (606), the reshaping-first video encoder (600) includes a color conversion block (640), a scaling and offset block (642), a subsampling block (644), a statistics collection block (646), and a joint reshaping and 3D rotation manager block (648). The reshaping-first video encoder (600) may include more or less operational blocks than shown. Additionally, the blocks are merely illustrative, and may be combined or separated. The reshaping-first video encoder (600) uses image statistics from the statistics collection block (646) to jointly determine reshaping and 3D rotation parameters. Then, the HDR video data is reshaped to a lower bit-depth content using forward reshaping block (604). The 3D rotation, scaling, and offset take place subsequently to obtain the base layer using 3D rotation block (606) and scaling and offset block (642), as described below. Subsampling may also be used through the subsampling block (644). The joint reshaping and 3D rotation manager block (648) determines the backward reshaping and inverse-rotation metadata for the decoder.

Statistics collection block (646) functions in a similar manner as previously described with respect to the statistics collection block (248). The 4 samples in each luma bin:

$(v_{b,mid}^Y, v_{b,min}^{Cb}, v_{b,min}^{Cr})$, $(v_{b,mid}^Y, v_{b,min}^{Cb}, v_{b,max}^{Cr})$, $(v_{b,mid}^Y, v_{b,max}^{Cb}, v_{b,min}^{Cr})$ and $(v_{b,mid}^Y, v_{b,max}^{Cb}, v_{b,max}^{Cr})$, for all b, are used to determine the 3D envelope of the HDR signal. When the reshaping functions are monotonically non-decreasing, the 3D envelope of the reshaped signal may be obtained by reshaping each point on the envelope.

Figure 14:
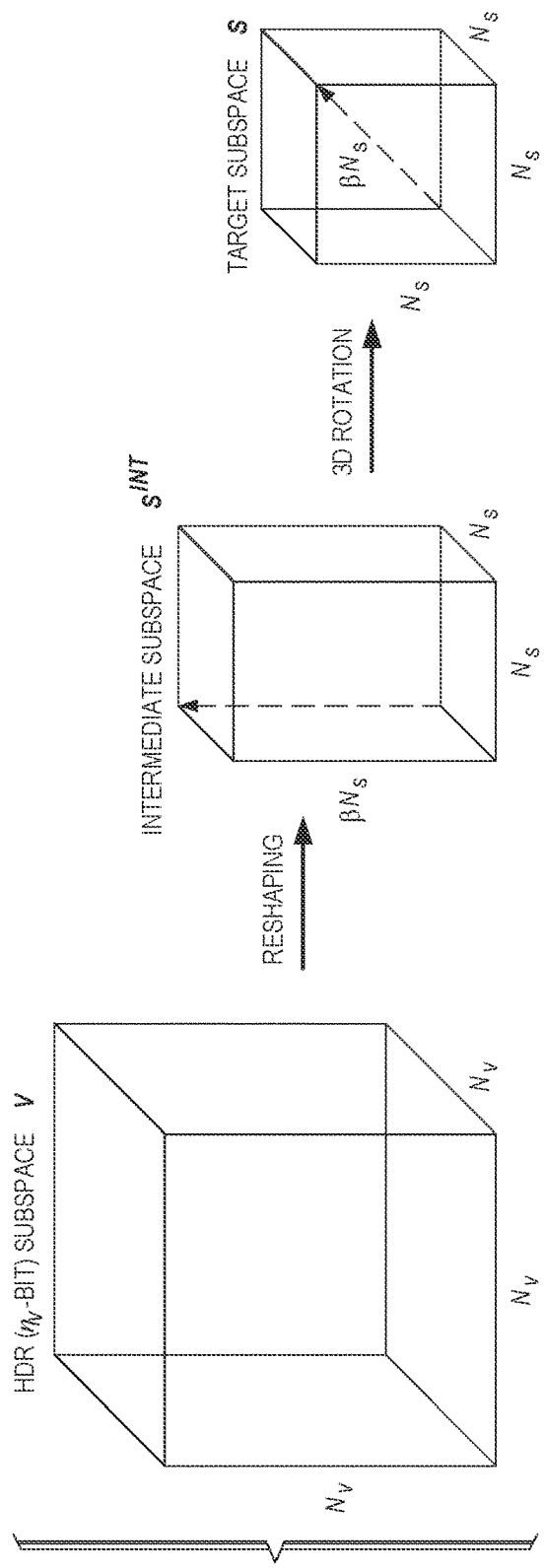
FIG. 14 depicts an example reshaping-first encoder workflow.

Prior to additional explanation of the reshaping-first pipeline (600), additional notation is needed. FIG. 14 provides a conceptual reshaping-first workflow. As depicted in FIG. 14, let the HDR YCbCr 3D subspace be denoted by V such that each axis p contains $N_v$, $\eta_v$-bit codewords, visualized as a 3D box. The vertical axis is imagined to be luma. Now, the target lower bit-depth 3D subspace is S, such that each axis p is normalized from the $\eta_s$-bit codeword to [0,1]. Let $S^{INT}$ be an intermediate 3D subspace such that $S \subseteq S^{INT}$, due to one of its axes q allows normalized $\eta_s$-bit codeword to be [0, β]. $\beta > (N_s-1)$. In this case, to allow maximum luma rotation. $\beta \leq [\sqrt{3}\ N_s -]1$. Thus, the maximum number of allowed codewords $\approx 1.73\ N_s - 1 = 442$ for 8-bit BL. The forward reshaping transforms the HDR content to lower-bit depth signal: $V \to S^{INT}$. The 3D rotation then performs $S^{INT} \to S$ to obtain the $\eta_s$-bit base layer. In other words, the HDR 16-bit codewords is reshaped to take luma values >255 for the 8-bit target base layer. The 3D rotation tilts the luma-axis to make it fit into the 8-bit cube. Signal clipping happens when in any axis p, the signal does not fit into the target subspace.

To achieve a non-clipping transformation, after performing 3D rotation $S^{INT} \to S$, there should not be any signal clipping in any axis. The rotation properties, mainly the angles of rotation (θ, φ), are determined based on no-clipping criteria. The properties of reshaping function such as β and an additive offset, are determined such that there is no-clipping during $S^{INT} \to S$. So, if the reshaping function is fixed, the pair of angles (θ, φ) cause no-clipping. But for a different set of angles, there may exist another reshaping function such that there is no-clipping. A joint design of reshaping and rotation parameters may assist in this.

In the reshaping-first pipeline, the original YCC content is reshaped by the forward reshaping block (604) to a lower bit-depth YCC space using the reshaping functions: $T_p^F(.)$ and $T_p^B(.)$ for p=Y,Cb,Cr channels. Beginning with luma reshaping, luma reshaping involves a primary reshaping and an additive offset in the reshaped domain. Let $T_{<Y>}^F$ be a primary luma reshaping function that is defined as $T_{<>}^F : [v_{min}^Y, v_{max}^Y], \to [0, \beta]$. This can be a linear stretch as shown below:

$$T_{(Y)}^F(v) = \begin{cases} 0 & \text{for } v < v_{min}^Y \\ \text{round}\left[\left(\frac{\beta}{v_{max}^Y - v_{min}^Y}\right)(v - v_{min}^Y)\right] & \text{for } v_{min}^Y \leq v \leq v_{max}^Y \\ \beta & \text{for } v > v_{max}^Y \end{cases}$$

In another example, it can be a content-adaptive reshaping based on block-based standard deviation, such as that described in U.S. Pat. No. 10,032,262, "Block-Based Content-Adaptive Reshaping for High Dynamic Range Images," by A. Kheradmand, G. Su, and C. Li, which is incorporated herein by reference in its entirety To facilitate joint reshaping-rotation, let $\Delta_Y^{off}$ be the reshaped-domain additive offset to be added to the reshaped luma content. The additive offset in luma is useful in avoiding signal clipping after 3D rotation. The luma forward reshaping is defined as, $T_Y^F : [v_{MIN}^Y, v_{MAX}^Y] \to [\Delta_Y^{off}, \beta + \Delta_Y^{off}]$, and:

$$s = T_Y^F(v) = T_{(Y)}^F(v) + \Delta_Y^{off}$$

Figure 15:
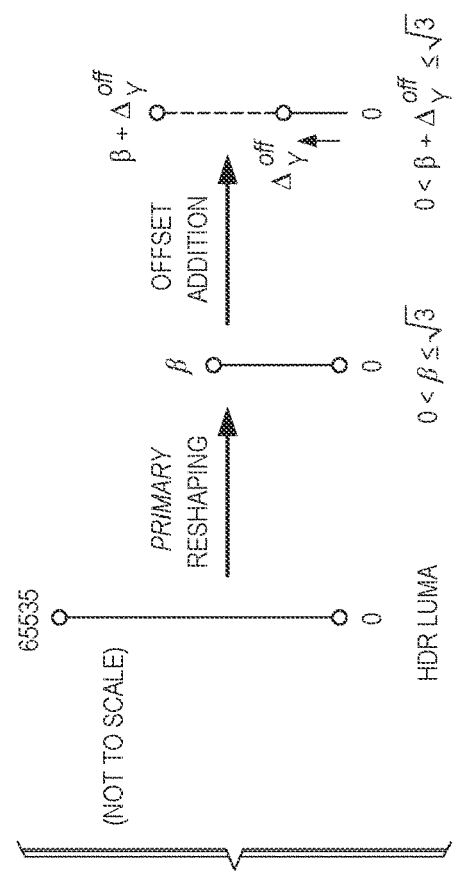
FIG. 15 depicts example ranges for HDR and BL codewords during the forward reshaping process.

FIG. 15 illustrates a range of 16-bit HDR to 8-bit BL codewords while using the forward reshaping. Since the reshaped content is rotated, the codewords may exceed 255 codewords in luma. The luma reshaping parameters $\Delta_Y^{off}$ and β are determined by the joint reshaping and 3D rotation manager block (648).

In chroma reshaping, chroma codeword-utilization factors (CUF) $\varphi_{Cb}, \varphi_{Cr}$ are selected as parameters. These CUFs are used to scale the resulting codeword-range within a minimum and maximum codeword range $s_{min}^p, s_{max}^p$:

$$s_{min}^p = 0$$

and $$s_{max}^p = \min\left(\text{round}\left[\varphi_p \cdot \beta \left(\frac{v_{max}^p - v_{min}^p}{v_{max}^Y - v_{min}^Y}\right)\right], \beta\right)$$

where $$p = Cb \text{ or } Cr.$$

Thus, the chroma forward reshaping for channel p is $T_p^F : [v_{min}^p, v_{max}^p] \to [s_{min}^p, s_{max}^p]$ as follows:

$$s = T_p^F(v) = \begin{cases} s_{min}^p & \text{for } v < v_{min}^p \\ s_{min}^p + \text{round}\left[\left(\frac{s_{max}^p - s_{min}^p}{v_{max}^p - v_{min}^p}\right)(v - v_{min}^p)\right] & \text{for } v_{min}^p \leq v \leq v_{max}^p \\ s_{max}^p & \text{for } v > v_{max}^p \end{cases}$$

Figure 16:
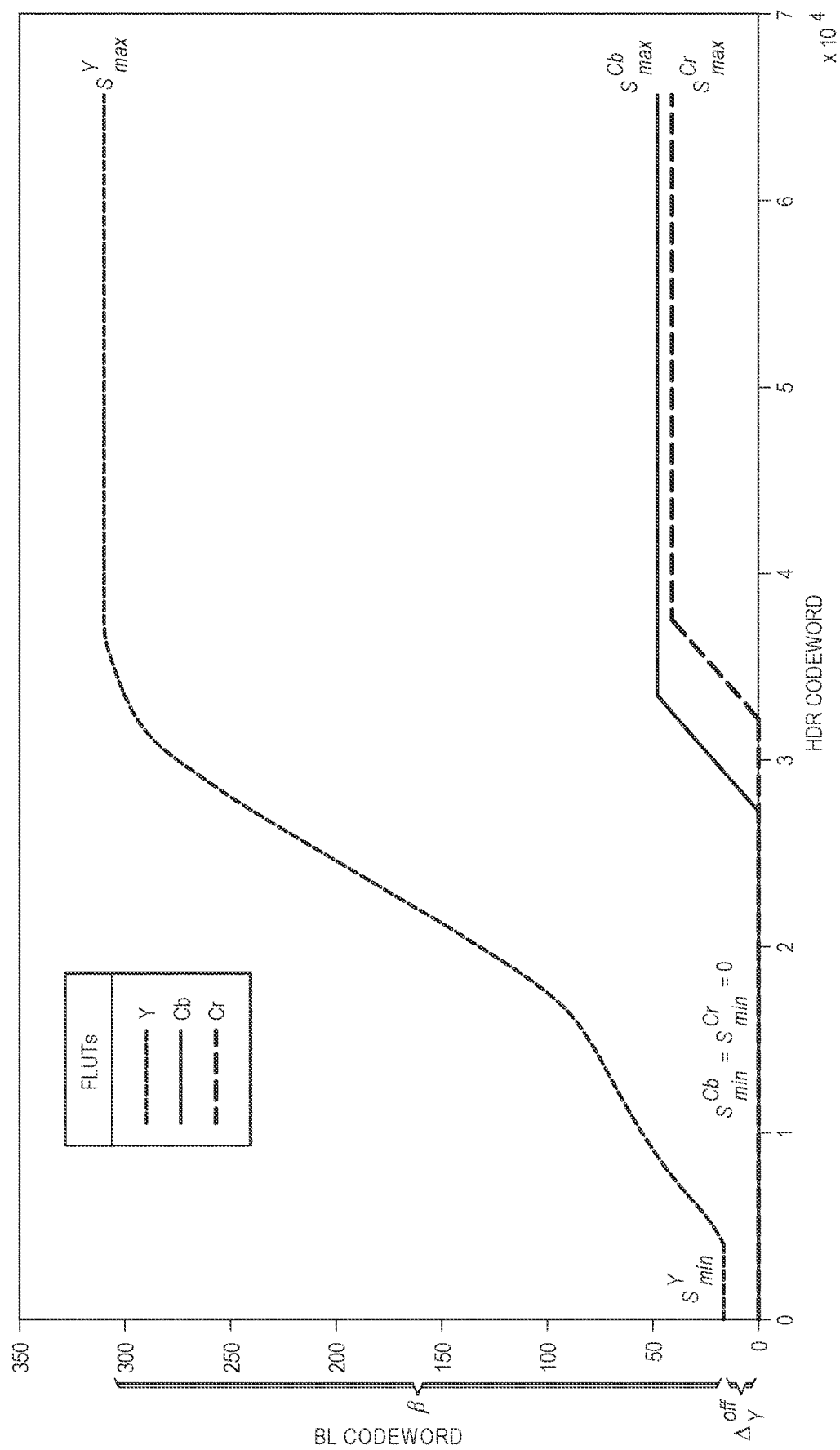
FIG. 16 depicts an example graph of forward reshaping functions performed by the reshaping-first encoder of FIG. 13.

FIG. 16 illustrates possible forward reshaping functions for the reshaping-first pipeline (600), where a block-based standard deviation method is used for luma reshaping. Other forward reshaping functions may also be used.

Next, let $(s_{b,mid}^Y, s_{b,min}^{Cb}, s_{b,min}^{Cr})$, $(s_{b,mid}^Y, s_{b,min}^{Cb}, s_{b,max}^{Cr})$, $(s_{b,mid}^Y, s_{b,max}^{Cb}, s_{b,min}^{Cr})$ and $(s_{b,mid}^Y, s_{b,max}^{Cb}, s_{b,max}^{Cr})$ for each b, define the 3D envelope of the reshaped signal. A matrix $S^{Env}$ of all 3D-envelope samples is formed after reshaping the HDR 3D envelope-matrix $V^{Env}$:

$$S^{Env} = \begin{bmatrix} s_{\gamma_0,mid}^Y & s_{\gamma_0,mid}^Y & s_{\gamma_0,mid}^Y & s_{\gamma_0,mid}^Y & \cdots & s_{\gamma_{N_\gamma-1},mid}^Y & s_{\gamma_{N_\gamma-1},mid}^Y & s_{\gamma_{N_\gamma-1},mid}^Y & s_{\gamma_{N_\gamma-1},mid}^Y \\ s_{\gamma_0,min}^{Cb} & s_{\gamma_0,min}^{Cb} & s_{\gamma_0,max}^{Cb} & s_{\gamma_0,max}^{Cb} & \cdots & s_{\gamma_{N_\gamma-1},min}^{Cb} & s_{\gamma_{N_\gamma-1},min}^{Cb} & s_{\gamma_{N_\gamma-1},max}^{Cb} & s_{\gamma_{N_\gamma-1},max}^{Cb} \\ s_{\gamma_0,min}^{Cr} & s_{\gamma_0,max}^{Cr} & s_{\gamma_0,min}^{Cr} & s_{\gamma_0,max}^{Cr} & \cdots & s_{\gamma_{N_\gamma-1},min}^{Cr} & s_{\gamma_{N_\gamma-1},max}^{Cr} & s_{\gamma_{N_\gamma-1},min}^{Cr} & s_{\gamma_{N_\gamma-1},max}^{Cr} \end{bmatrix}$$

As there are four 3D entries per slice and total $N_\gamma$ slices, the matrix is of size: $(3 \times 4N_\gamma)$. The backwards reshaping function may be derived as inverse mapping.

For 3D rotation with the 3D rotation block (606), the angles of rotation (θ, φ) should be selected by the joint reshaping and 3D rotation manager (648) to avoid signal-clipping after rotation. For example, the 3D rotation block (606) applies the 3×3 matrix $R_{Cb,Cr}(\theta, \phi)$ to perform rotation around origin to the 3D-envelope samples $S^{Env}$ to obtain $\breve{S}^{Env}$:

$$\breve{S}^{Env} = R_{Cb,Cr}(\theta, \phi) S^{Env},$$

where each column represents a point on the rotated reshaped-3D envelope. If any point goes beyond the $\eta_s$-bit codeword range, the information may be lost due to clipping, and the corresponding angle pair $(\theta, \phi)$ may not be used. To discover at least one pair $(\theta, \phi)$ exists that can take the original HDR signal bounded by the 3D envelope to the target subspace S without clipping, $\breve{s}_{min}^{Env,p}$, $\breve{s}_{max}^{Env,p}$ may be set as the minimum and maximum value in p-axis. To ensure no-clipping, the criteria $\Phi_{NC}$:

$$\breve{s}_{min}^{Env,p} \geq 0$$

and $$\breve{s}_{max}^{Env,p} \leq N_S - 1$$

for all $p$

Figure 17:
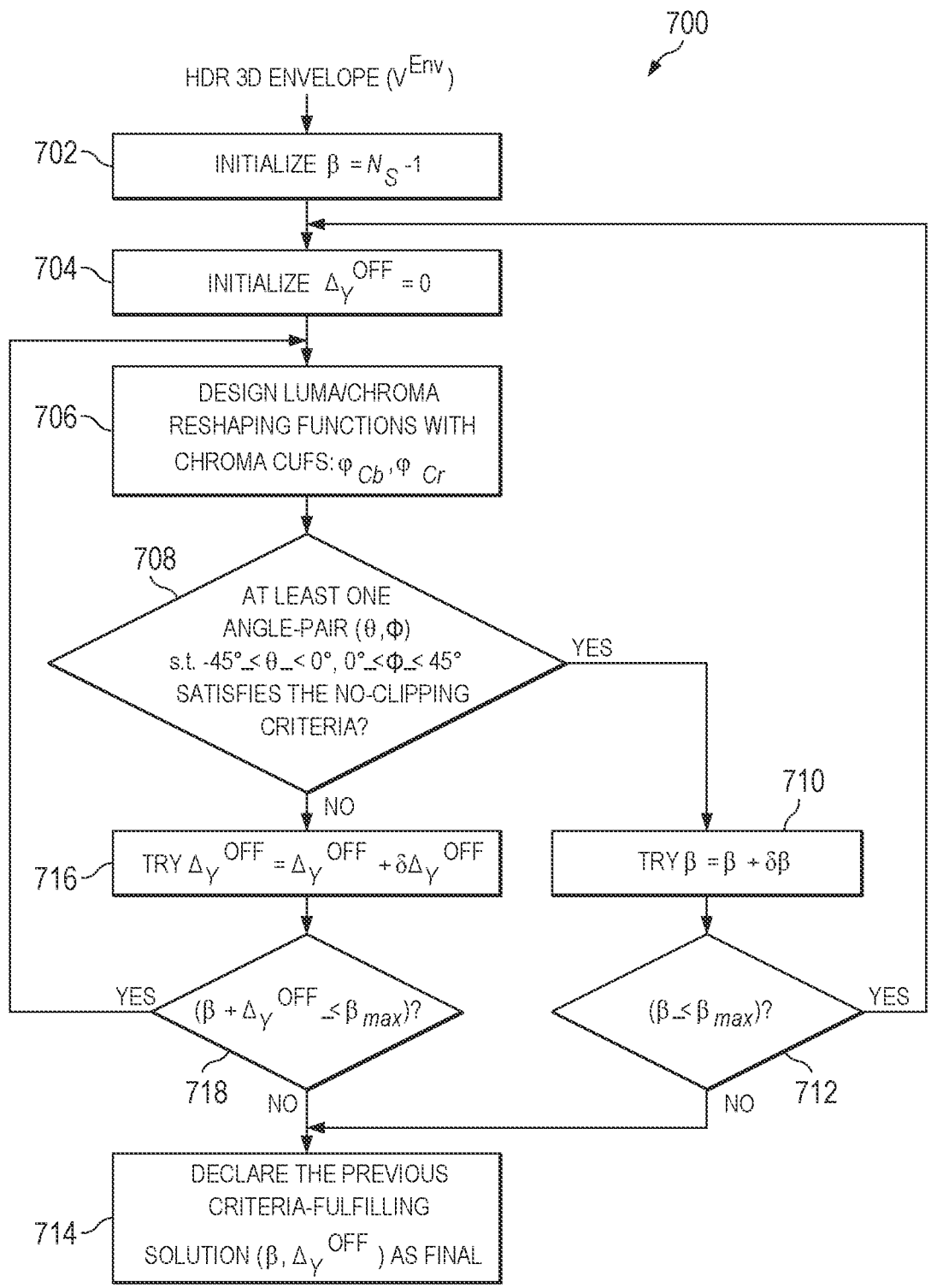
FIG. 17 depicts an example block diagram of a method performed by the reshaping-first encoder of FIG. 13.

This criteria $\Phi_{NC}$ ensures that each pixel of the reshaped image can be represented as $\eta_s$-bit codeword after the 3D rotation, without undergoing clipping. The rotation parameter is the angle-pair $(\theta, \phi)$. The joint reshaping and 3D rotation manager (648) determines the reshaping and rotation parameters $\Delta_Y^{off}$, $\beta$, $\phi_{Cb}$, $\phi_{Cr}$, and $(\theta, \phi)$. In one implementation, the reshaping and rotation parameters are determined by conducting a full search over the entire parameter space. FIG. 17 illustrates a method (700) for conducting a full search to uncover the reshaping and rotation parameters. The method (700) may be performed by the joint reshaping and 3D rotation manager (648). By using method (700), the joint reshaping and 3D rotation manager (648) investigates the effect of CUFs $\phi_{Cb}$, $\phi_{Cr}$ on the total luma codewords, $\beta$, using a full-search of $\Delta_Y^{off}$ and angle-pairs $(\theta, \phi)$. In method (700), the CUFs $\phi_{Cb}$, $\phi_{Cr}$ are fixed.

At block (702), the joint reshaping and 3D rotation manager (648) sets $\beta=N_s-1$ as an initial setting, or the case of no additional luma codewords. From here, the joint reshaping and 3D rotation manager (648) increments the luma codewords $\beta$ until there exists at least one solution with $\Delta_Y^{off}$ and $(\theta, \phi)$ pair such that it satisfies $\Phi_{NC}$. Here, $\delta\beta$=round[0.01($N_s$−1)]≈4 codewords for 8-bit.

Table 1 provides example values for the CUFs $\phi_{Cb}$, $\phi_{Cr}$ and the chroma codewords. In the example, the 16-bit HDR is reshaped to 8-bit BL i.e. $N_s$=255. For each chroma CUF, the reshaping and rotation parameters are computed to satisfy $\Phi_{NC}$ using method (700). Some parameters are listed for each chroma CUF

TABLE 1

| Example chroma CUF vs Additional Codewords | | | | | |
|---|---|---|---|---|---|
| Chroma CUF | # Chroma codewords | | | Normalized luma | Percent Additional |
| $\phi_{Cb} = \phi_{Cr}$ | $s_{max}^{Cr}$ | $s_{max}^{Cb}$ | $\Delta_Y^{off}$ | codewords | Codewords |
| 1.00 | 49 | 42 | 56 | 1.39 | 39% |
| 0.75 | 37 | 31 | 44 | 1.47 | 47% |

TABLE 1-continued

| Example chroma CUF vs Additional Codewords | | | | | |
|---|---|---|---|---|---|
| Chroma CUF | # Chroma codewords | | | Normalized luma | Percent Additional |
| $\phi_{Cb} = \phi_{Cr}$ | $s_{max}^{Cr}$ | $s_{max}^{Cb}$ | $\Delta_Y^{off}$ | codewords | Codewords |
| 0.50 | 25 | 21 | 32 | 1.55 | 55% |
| 0.25 | 13 | 11 | 16 | 1.64 | 64% |
| 0.05 | 3 | 3 | 2 | 1.72 | 72% |
| Theoretical limit | 1 | 1 | 0 | $\sqrt{3} \approx 1.732$ | 73.2% |

Beginning with chroma CUF=1, the chroma axis uses the same number of luma codewords. Table 1 shows that, as the chroma CUF reduces, the number of luma codewords increases, indicated by the percent of additional codewords available for luma content. Additionally, as chroma CUF reduces, a smaller luma offset $\Delta_Y^{off}$ is needed to be able to produce a constraint-satisfying angle-pair. As chroma CUF reduces, there is more space for luma codewords and that our 3×3 rotation indeed transfers luma information to chroma axis in some form. When the chroma CUF is reduced to a very small fraction, it indicates the signal is almost chroma-neutral, and it approximately coincides with the luma axis. Such signal can be possibly rotated to align with the 3C cube-diagonal without any clipping. This allows ≈$\sqrt{3}$ luma codewords (i.e., a 73.2% increase). However, setting the CUF too low means allocating less BL chroma codewords. This may cause high quantization in chroma axes, leading to color artifacts. With fixed CUF, the other parameters $\beta$, $\Delta_Y^{off}$ and $(\theta, \phi)$ can be determined for each image in the HDR video data.

Figure 18:
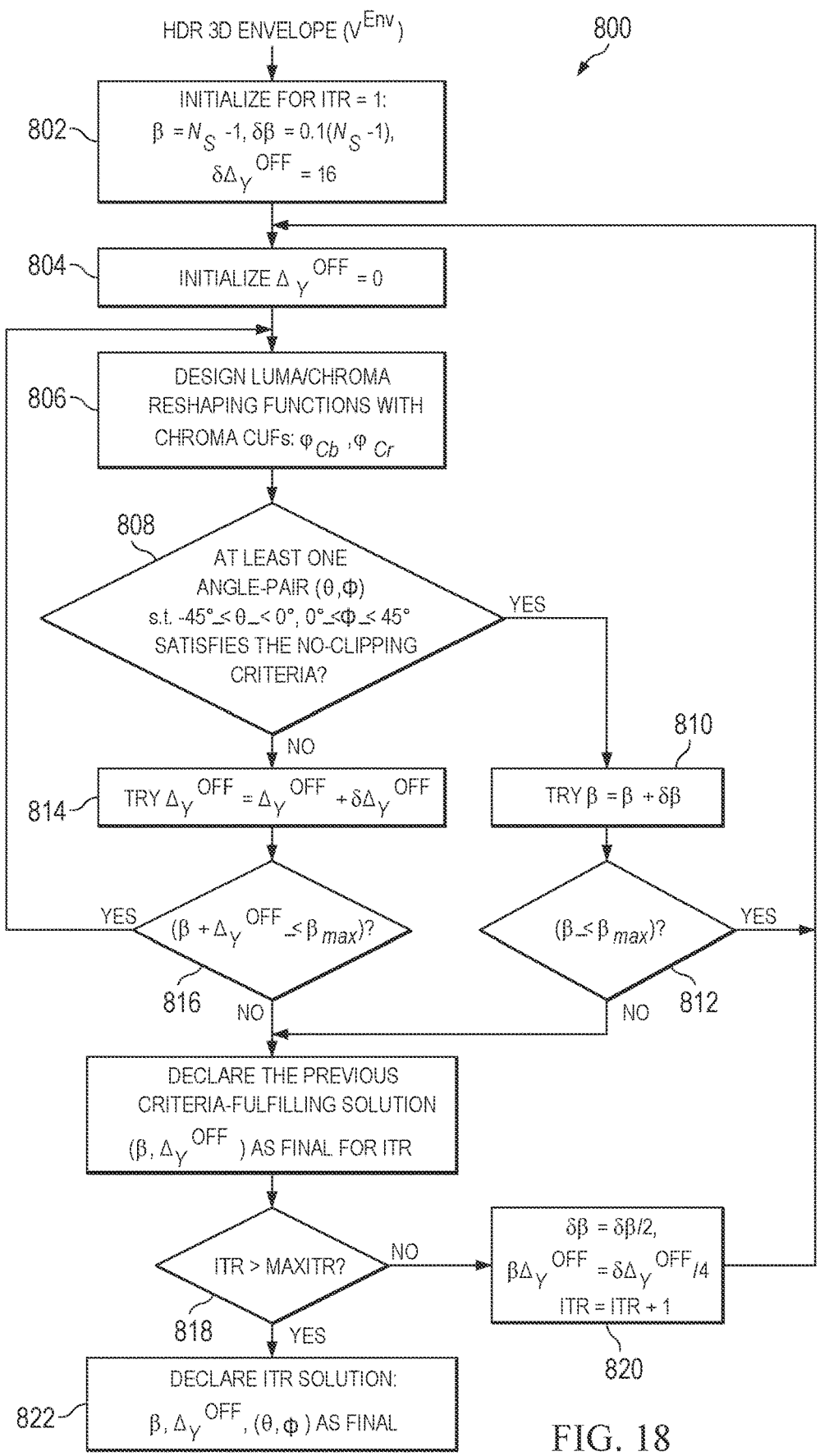
FIG. 18 depicts an example block diagram of another method performed by the reshaping-first encoder of FIG. 13.
Figure 19:
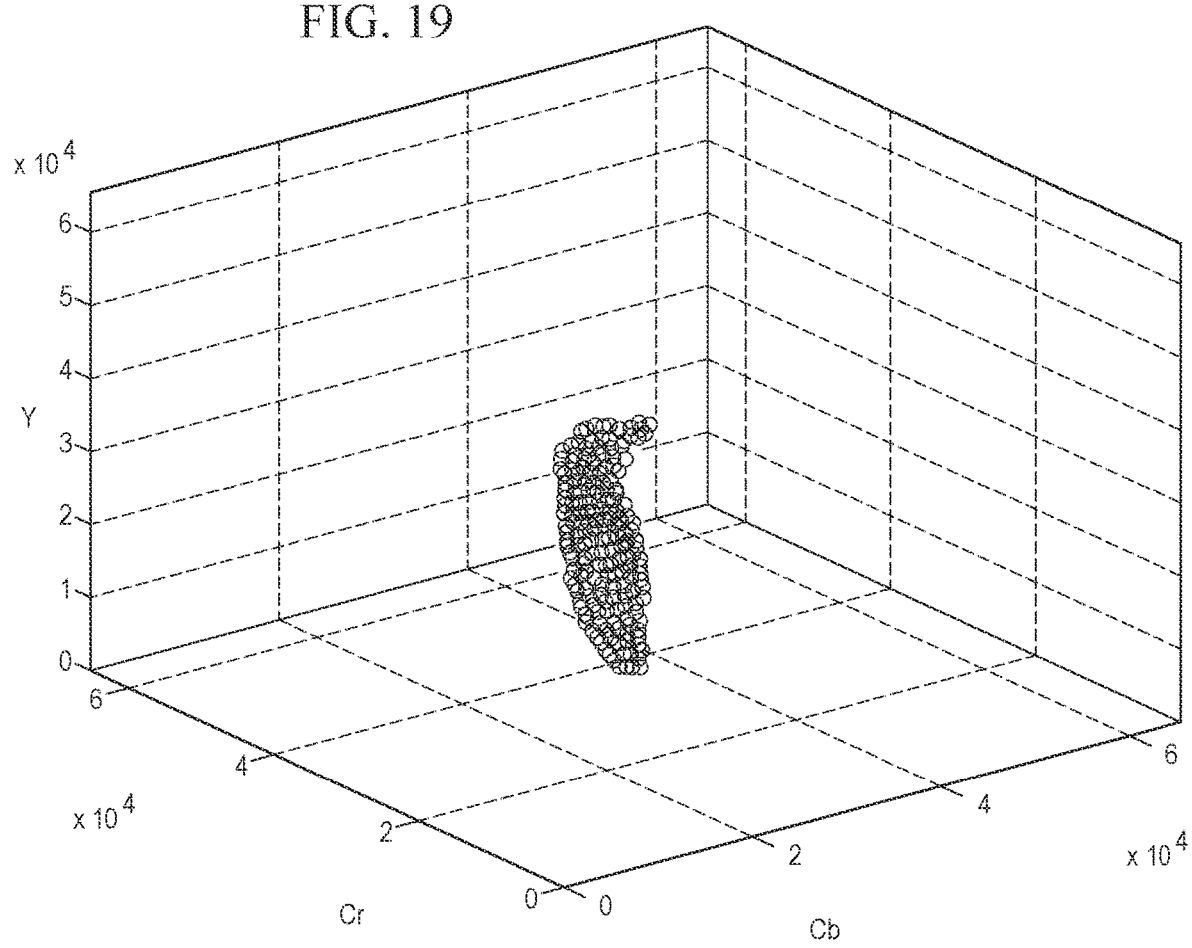
FIG. 19 depicts an example three-dimensional scatter plot of an HDR image.

In another implementation, a multi-step search algorithm is used by the joint reshaping and 3D rotation manager (648) to determine the reshaping and rotation parameters. FIG. 18 illustrates a method (800) for conducting a multi-step search to uncover the reshaping and rotation parameters. The method (800) may be performed by the joint reshaping and 3D rotation manager (648). At block (802), the joint reshaping and 3D rotation manager (648) sets $\beta=N_s-1$ as an initial setting, or the case of no additional luma codewords. Additionally, $\Delta_Y^{off}\beta$=16 and $\delta\beta$ (0.1($N_s$−1))≈44 codewords are initialized for 8-bit. In the first iteration, the luma codewords $\beta$ are incremented by $\delta\beta$ until there exists at least one solution with some $\Delta_Y^{off}$ and $(\theta, \phi)$ pair such that it satisfies $\Phi_{NC}$. The next iteration, the joint reshaping and 3D rotation manager (648) reduces $\delta\beta=\delta\beta/2$, $\Delta_Y^{off}=\Delta_Y^{off}/4$, to improve the precision of the solution. This is run for MAXITR (=2 or 3) to get a higher precision solution. The resulting scatterplot is provided in FIG. 19.

Figure 20:
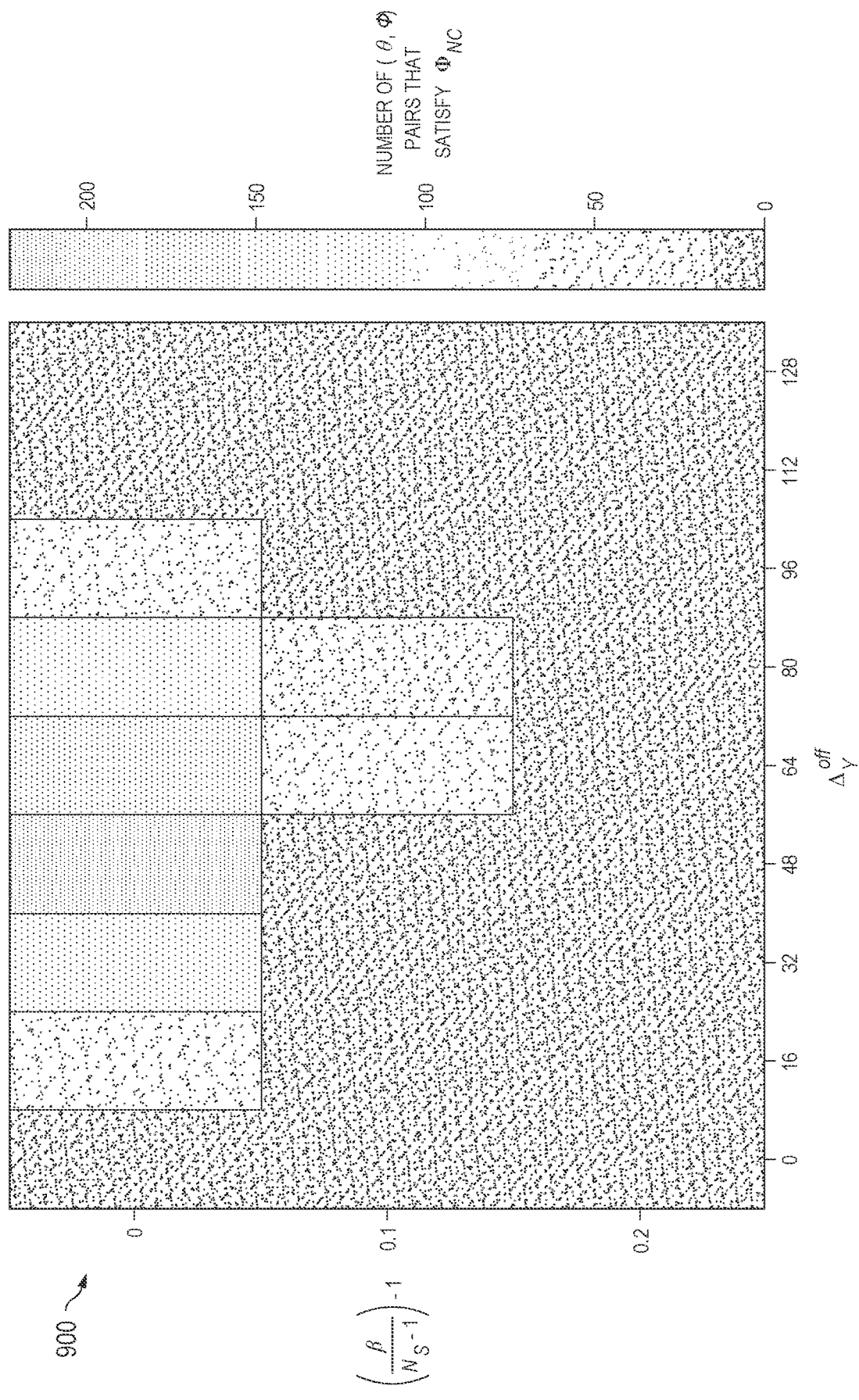
FIG. 20 depicts an example colorbar of a number of angle-pairs that satisfy a no-clipping criteria in an iteration of the method depicted in FIG. 18.

The resulting first colorbar (900) of the first iteration of method (800) is provided in FIG. 20. The first colorbar (900) indicates a number of angle-pairs that satisfy the no-clipping criteria. The first iteration provides a number of possible $(\theta, \phi)$ solutions for $\beta$, $\Delta_Y^{off}$ in 8-bit BL. The two axis indicate $\beta$ and $\Delta_Y^{off}$. The number of angle-pairs that satisfy $\Phi_{NC}$ for that particular $\beta$, $\Delta_Y^{off}$ values are color-coded. For example, at Y-axis value 0.1 means $\beta$=round[(1+0.1)*255]≈281 luma codewords, a number of $\Delta_Y^{off}$'s are found ranging from 16 to 96 that can produce≥1 no. of $(\theta, \phi)$ that satisfy $\phi_{NC}$.

Figure 21:
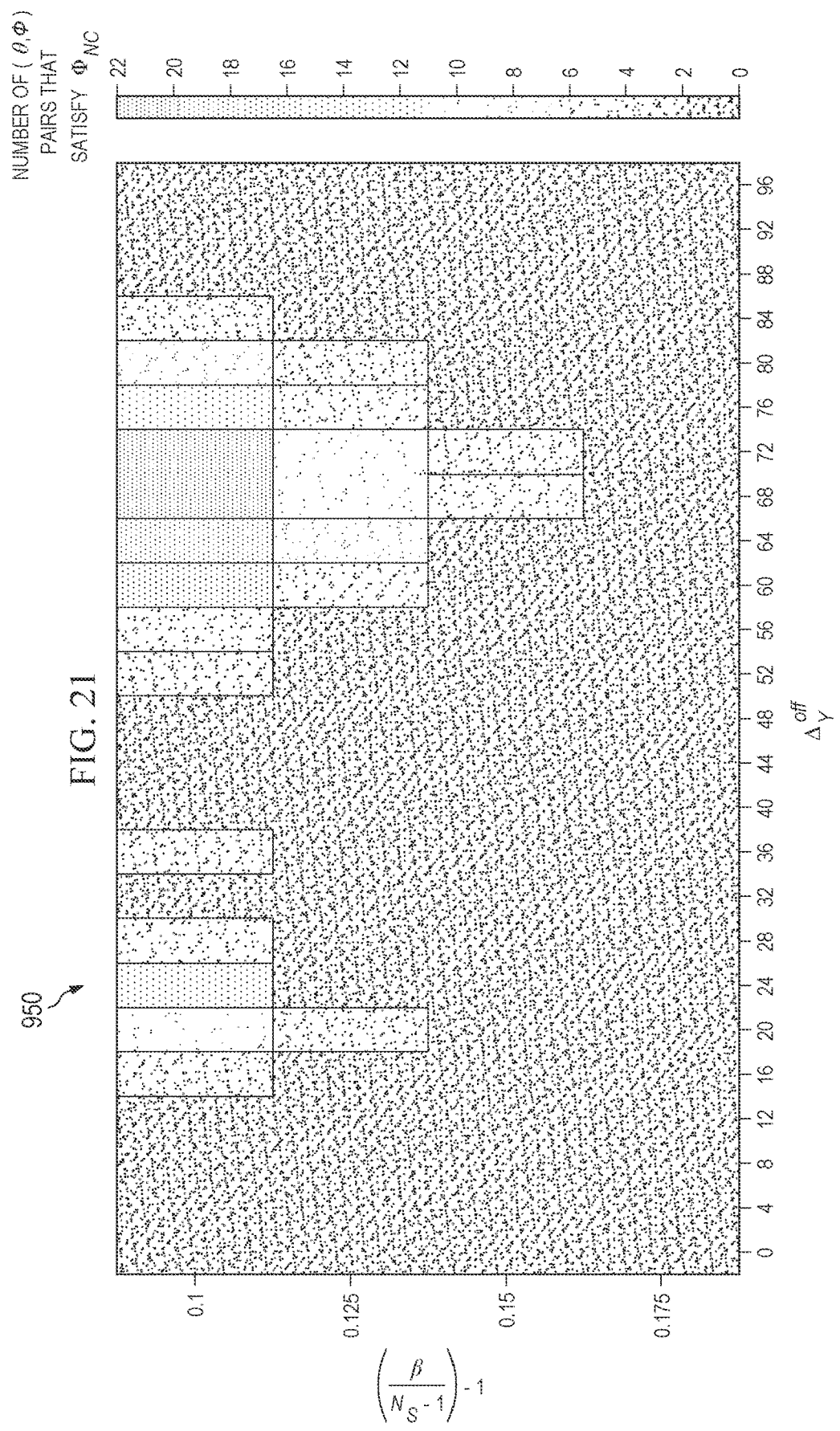
FIG. 21 depicts an example colorbar of a number of angle-pairs that satisfy a no-clipping criteria in another iteration of the method depicted in FIG. 18.

The resulting second colorbar (950) of the second iteration of method (800) is provided in FIG. 21. In the second iteration, the precision of $\beta$ and $\Delta_Y^{off}$ is increased. In this example, the highest number of luma codewords is achieved at $\beta$=round[(1+0.15)*255]≈293 using $\Delta_Y^{off}$=68 or 72.

Figure 22:
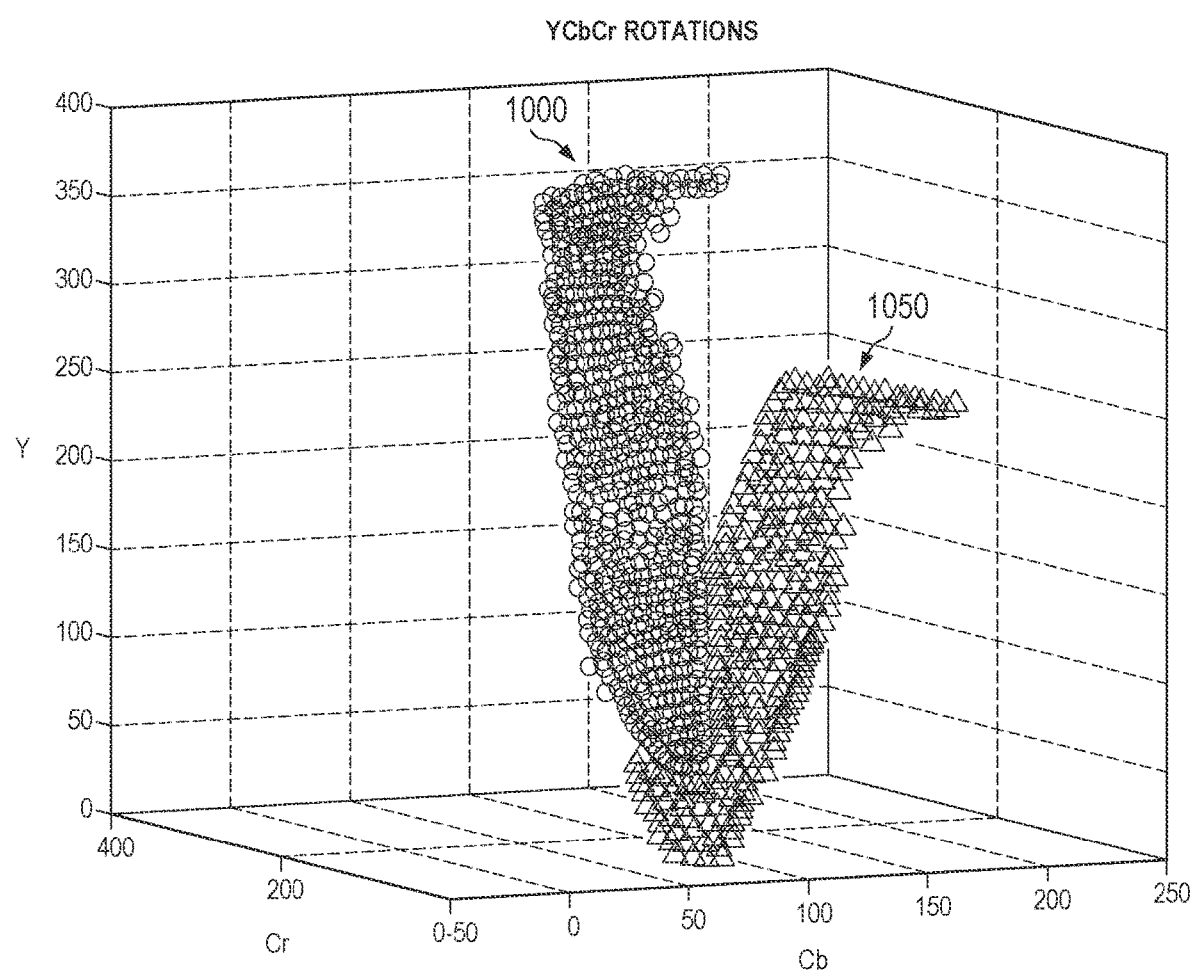
FIG. 22 depicts an example three-dimensional scatterplot of the YCbCr image of FIG. 19 in a reshaped domain and after rotation.

FIG. 22 provides a scatterplot illustrating the HDR video image in the reshaped domain. The first scatterplot 1000 shows the reshaped 3D scatter of the HDR video image after forward reshaping. The reshaping functions are based on β and $\Delta_Y^{off}$ as previously described. The second scatterplot 1050 shows the 3D scatter of the HDR video image after 3D rotation using the constraint satisfying (θ, φ)=(−35°,36°).

Figure 23:
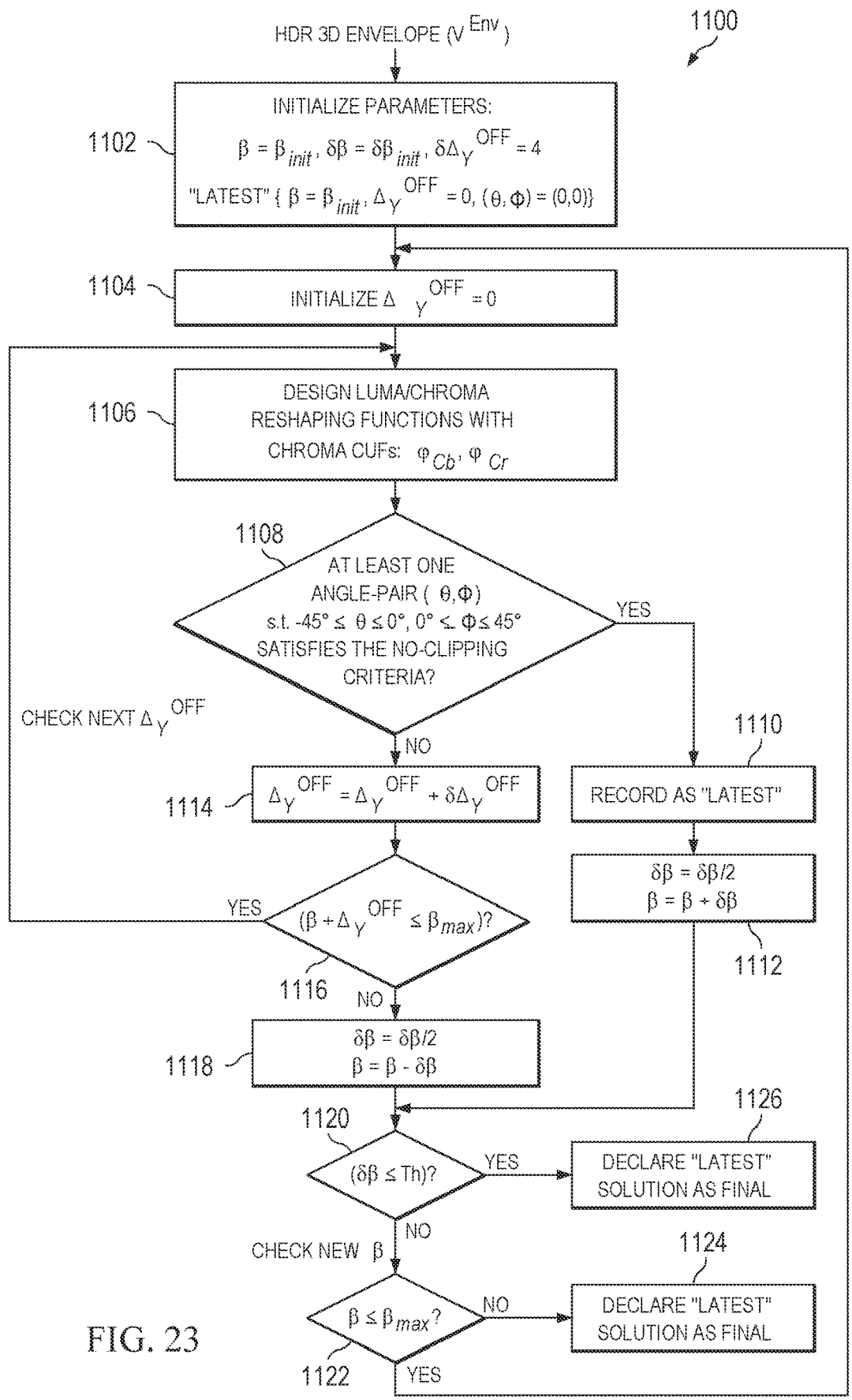
FIG. 23 depicts an example rotation-first encoder workflow.

In another implementation, a bisection search algorithm is used by the joint reshaping and 3D rotation manager (648) to determine the reshaping and rotation parameters. FIG. 23 illustrates a method (1100) for conducting a bisection search to uncover the reshaping and rotation parameters. The method (1100) may be performed by the joint reshaping and 3D rotation manager (648). The method (1100) provides a search-space for β between $N_s-1 \leq \beta \leq \text{round}[\sqrt{3}\, N_s]-1$. The joint reshaping and 3D rotation manager (648) starts from the midpoint to check if any solution exists. If so, the joint reshaping and 3D rotation manager (648) can search in the upper-half search-space by starting with the midpoint. This process continues until the joint reshaping and 3D rotation manager (648) reaches some predetermined level of precision "Th". The example of FIG. 23 begins with $$\beta_{init} = \text{round}\left[(N_S - 1) + \frac{\beta_{max} - (N_S - 1)}{2}\right],$$

$$\delta\beta_{init} = \text{round}\left[\frac{\beta_{max} - (N_S - 1)}{2}\right],$$

Th=0.05 ($N_S-1$).

Returning to FIG. 13, the color conversion block (640) converts the original HDR video data from a first color space to a second color space, and functions in a manner similar to that of the color conversion block (240). The forward reshaping block (604) reshapes the received $\eta_v$-bit HDR signal using $T_Y^F$, $T_{Cb}^F$, $T_{Cb}^F$, a set of functions determined by the joint reshaping and 3D rotation manager (648), to the $\eta_s$-bit BL:

$$s_i^p = T_p^F(v_i^p),$$

for each pixel i in the image, for all three axes p=Y,Cb,Cr.

The YCC-domain reshaped signal undergoes 3×3 matrix-rotation at the 3D rotation block (606) using $R_{CbCr}(\theta, \phi)$. The resulting signal at pixel i is ($s_i^a$, $s_i^b$, $s_i^c$) in the abc-space:

$$\begin{bmatrix} s_i^a \\ s_i^b \\ s_i^c \end{bmatrix} = R_{CbCr}(\theta, \phi) \begin{bmatrix} s_i^Y \\ s_i^{Cb} \\ s_i^{Cr} \end{bmatrix}$$

The scaling and offset block (642) scales and offsets the reshaped chroma signal in order to allow only a fraction of all available codewords for the chroma and bring chroma neutral point to the center of the BL codeword range. This makes the HDR video content compatible with all standard video codecs, such as Advanced Video Coding (AVC). Let the scaling factors be $\lambda_p(\leq 1)$ and the additive offsets be denoted by $\varsigma_p$. The resulting signal at pixel i is $\tilde{s}_i^p$, where p is b,c, whose range is $\tilde{s}_{range}^p$:

$$\tilde{s}_{range}^p = \text{round}[\lambda_p(s_{max}^p - s_{min}^p)]$$

and $$\varsigma_p = \text{round}\left[\frac{N_S}{2} - \frac{\tilde{s}_{range}^p}{2}\right]$$

Thus, after scaling and offset for chroma channel p:

$$\tilde{s}_i^p = \varsigma_p + \text{round}[\lambda_p(s_i^p - s_{min}^p)]$$

The subsampling block (644) functions in a manner similar to subsampling block (252). When needed, the transformed BL signal is optionally down-sampled to 4:2:0 format, using a analogous to the luma axis and b & c to Cb and Cr axes. ($s_i^a$, $s_i^{b,d}$, $s_i^{c,d}$) defines the downsampled signal at pixel.

Figure 24:
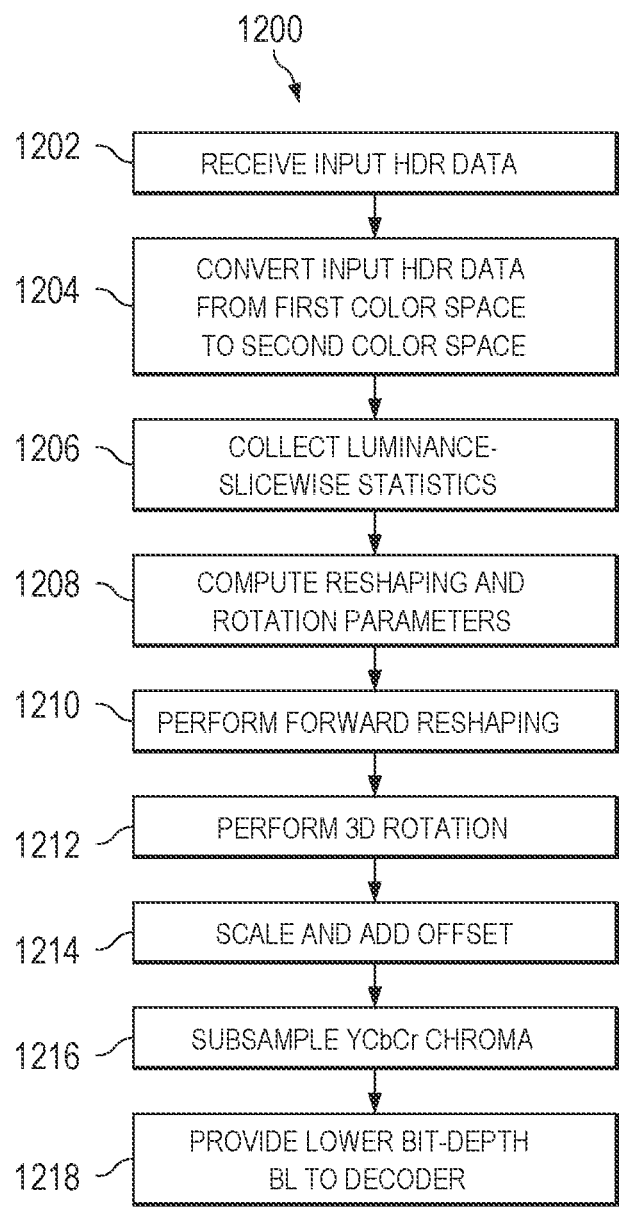
FIG. 24 depicts an example block diagram of another method performed by the rotation-first encoder of FIG. 13.

FIG. 24 provides a method (1200) that details the operations of the reshaping-first video encoder (600). At block (1202), the reshaping-first video encoder (600) receives the input HDR video data (or a single input HDR image), such as final production (117). At block (1204) the reshaping-first video encoder (600) converts the input HDR video data from a first color space to a second color space, such as from RGB to YCC.

At block (1206), the reshaping-first video encoder (600) collects luminance-slicewise statistics using the statistics collection block (646). At block (1208), the reshaping-first video encoder (600) computes reshaping and rotation parameters using the joint reshaping and 3D rotation manager (648). The reshaping and rotation parameters may include, for example, the 3×3 rotation matrix and offsets that are computed as metadata. At block (1210), the reshaping-first video encoder (600) performs forward reshaping using the forward reshaping block (604). At block (1212), the reshaping-first video encoder (600) performs 3D rotation using the 3D rotation block (606). At block (1214), the reshaping-first video encoder (600) performs scaling and adds offset using the scaling and offset block (642). At block (1216), the reshaping-first video encoder (600) subsamples the YCC chroma using the subsampling block (644). At block (1218), the rotation-first video encoder (600) provides the lower bit-depth BL to the rotation-first video decoder (620).

FIG. 25 illustrates a block diagram of the reshaping-first video decoder (620). The reshaping-first video decoder (620) includes an up-sampling block (1302), an offset and scaling block (1304), a 3×3 matrix rotation block (1306), and a backward reshaping block (1308). However, the reshaping-first video decoder (620) may also have more or less operational blocks. Additionally, the blocks are merely illustrative, and may be combined or separated The decompressed BL, backward reshaping metadata, and 3×3 matrix and offset metadata are used to reconstruct the HDR signal. If the signal is in 4:2:0 format, the up-sampling block (1302) performs 4:4:4 up-sampling to make the three planes of equal size. Then, after offset subtraction and scaling with the offset and scaling block (1304), the 3×3 matrix rotation is performed using the 3×3 matrix rotation block (1306) to obtain the YCC-domain signal. Then, backwards reshaping is performed by the backward reshaping block (1308) to reconstruct the HDR YCC signal. The signal can be converted to RGB using a color conversion matrix if needed.

Scene-Based Architectures

Both the rotation-first pipeline (150) and the reshaping-first pipeline (550) encode and decode HDR video data one frame at a time. However, complete scenes of HDR video data may also be encoded and decoded at a time. FIG. 26 provides a scene-based encoder (1400). The scene-based encoder (1400) includes a color conversion block (1402), a scene statistic collection block (1404), a rotation manager (1406), a reshaping manager (1408), a scene 3D rotation, scaling, offset, and subsampling block (1410), a scene forward reshaping block (1412), a rotation and reshaping metadata estimation block (1414), and a video compression block (1416). However, the scene-based encoder (1400) may also have more or less operational blocks. Additionally, the blocks are merely illustrative, and may be combined or separated The scene-based encoder (1400) functions using methods and operations as described with respect to the rotation-first encoder (200), only for a complete scene instead of a single frame. The scene statistic collection block (1404) collects statistics for the entire scene, such as the 3D envelope representing all pixels in the scene. The rotation manager (1406) and the reshaping manager (1408) determine the rotation and reshaping parameters based on the scene statistics. For each frame in the scene, the same rotation, scaling, offset, and subsampling is performed using the scene 3D rotation, scaling, offset, and subsampling block (1410). Additionally, for each frame in the scene, the same forward reshaping is applied by the scene forward reshaping block (1412). The RPU bitstream consists of backward reshaping and rotation parameters for the corresponding decoder.

The above video delivery systems and methods may provide for encoding and decoding high dynamic range (HDR) video data in three-dimensional space. Systems, methods, and devices in accordance with the present disclosure may take any one or more of the following configurations.

(1) A method for encoding video data, the method comprising: receiving the video data, the video data composed of a plurality of image frames, each image frame including a plurality of pixels, determining, for each image frame, a rotation matrix, wherein applying the rotation matrix to each pixel of the plurality of pixels rotates the video data around a chroma-neutral point in a three dimensional color space, determining, for each image frame, at least one of a scaling factor and an offset factor, determining, for each image frame, a reshaping function based on one or more values of each of the plurality of pixels, and generating an output image for each image frame by applying the rotation matrix, the reshaping function, and the at least one of the scaling factor and the offset factor to the respective image frame, wherein the rotation matrix is applied to each pixel of the plurality of pixels for the respective image frame before the reshaping function is applied to the respective image frame.

(2) The method according to (1), further comprising: generating, for each image frame, reverting metadata including an inverse rotation matrix, an inverse reshaping function, and the at least one of the scaling factor and the offset factor, and providing the output image and the reverting metadata to a decoder configured to decode the received output image using the reverting metadata.

(3) The method according to any one of (1) to (2), wherein each pixel of the plurality of pixels includes one or more chroma channels and a luma channel, the method further comprising: determining, for each image frame, a range of base layer codewords for each chroma channel based on a ratio of a chroma range to a luma range of the image frame.

(4) The method according to (3), wherein the chroma-neutral point is shifted to a center of a base layer axis.

(5) The method according to any one of (1) to (4), wherein, after applying the scaling factor, a vector defining color channels of each pixel has a magnitude of less than or equal to 1.

(6) The video delivery system according to any one of (1) to (5), wherein each pixel includes a luminance value, a Cb value, and a Cr value, and wherein the method further comprises: dividing the luminance value of each pixel into a predetermined number of codewords, computing a luma-bin index for each pixel, setting a minimum pixel value and a maximum pixel value for the Cb value and the Cr value of each pixel, and determining a three dimensional envelope of the video data.

(7) The method according to (6), wherein the at least one of the scaling factor and the offset factor are determined using the three dimensional envelope such that the image frame data after applying the rotation matrix is contained within the original three dimensional space.

(8) The method according to (6), further comprising multiplying each pixel of the plurality of pixels by an allowed signal range divided by a range of the three dimensional envelope.

(9) The method according to (6), wherein the minimum pixel value and the maximum pixel value for the Cb value and the Cr value of each pixel are used to determine the rotation matrix.

(10) A non-transitory computer-readable medium storing instructions that, when executed by an electronic processor, cause the electronic processor to perform operations comprising any one of (1) to (9).

(11) A method for encoding video data, the method comprising: receiving the video data, the video data composed of a plurality of image frames, each image frame including a plurality of pixels, determining, for each image frame, a rotation matrix, wherein applying the rotation matrix to each pixel of the plurality of pixels rotates the video data around a chroma-neutral point in a three dimensional color space, determining, for each image frame, at least one of a scaling factor and an offset factor, determining, for each image frame, a reshaping function based on one or more values of each of the plurality of pixels, and generating an output image for each image frame by applying the rotation matrix, the reshaping function, and the at least one of the scaling factor and the offset factor to the respective image frame, wherein the reshaping function is applied to the respective image frame before the rotation matrix is applied to each pixel of the plurality of pixels for the image frame.

(12) The method according to (11), further comprising: generating, for each image frame, reverting metadata including an inverse rotation matrix, an inverse reshaping function, and the at least one of the scaling factor and the offset factor, and providing the output image and the reverting metadata to a decoder configured to decode the received output image using the reverting metadata.

(13) The method according to any one of (11) to (12), wherein the reshaping function includes a primary luma reshaping function and a reshaped-domain additive offset.
(14) The method according to (13), wherein the primary luma reshaping function is a linear stretch.
(15) The method according to any one of (11) to (14), wherein the reshaping function includes a chroma reshaping with chroma codeword-utilization factors selected to scale a resulting codeword-range within a minimum codeword range and a maximum codeword range.
(16) The method according to (15), wherein decreasing the chroma codeword-utilization factors increases a number of luma codewords
(17) The method according to any one of (11) to (16), wherein each pixel includes a luminance value, a Cb value, and a Cr value, and wherein the method further comprises: dividing the luminance value of each pixel into a predetermined number of codewords, computing a luma-bin index for each pixel, setting a minimum pixel value and a maximum pixel value for the Cb value and the Cr value of each pixel, and determining a three dimensional envelope of the video data.
(18) The method according to (17), further comprising: applying, for each image frame, the rotation matrix to the three dimensional envelope, and determining, for each image frame, a pair of angles of rotation in which all pixels of the plurality of pixels for the image frame are rotated by the rotation matrix without clipping.
(19) The method according to any one of (11) to (18), wherein the output image is defined by a base layer codewords, and wherein the base layer codewords exceeds 255 codewords in luma.
(20) A non-transitory computer-readable medium storing instructions that, when executed by an electronic processor, cause the electronic processor to perform operations comprising any one of (11) to (19).
(21) A method for decoding video data, the method comprising: receiving a coded bit stream, the coded bit stream including a plurality of image frames, each image frame including a plurality of pixels, receiving, for each image frame, decoding metadata, determining, based on the decoding metadata, a backward reshaping function, determining, for each image frame, at least one of a scaling factor and an offset factor, determining, for each image frame, a rotation matrix, wherein applying the rotation matrix to each pixel of the plurality of pixels rotates the video data around a chroma-neutral point, and generating an output image for each image frame by applying the backward reshaping function, the at least one of the scaling factor and the offset factor, and the rotation matrix to the respective image frame, wherein the backward reshaping function is applied to the respective image frame before the rotation matrix is applied to each pixel of the plurality of pixels of the respective image frame.
(22) The method according to (21), wherein the decoding metadata includes the backward reshaping function, the rotation matrix, and the at least one of the scaling factor and the offset factor.
(23) The method according to any one of (21) to (22), further comprising up-sampling the received coded bit stream to 4:4:4 format.
(24) The method according to any one of (21) to (23), wherein, after applying the scaling factor, a vector defining color channels of each pixel has a magnitude of greater than or equal to 1.
(25) The method according to any one of (21) to (24), wherein the received color bit stream is of a first color space, and wherein the method further comprises converting the video data from the first color space to a second color space.
(26) The method according to (25), wherein the first color space is a color space with one luma axis and two chroma axes, and wherein the second color space is an RGB color space.
(27) The method according to any one of (21) to (26), wherein each pixel of the plurality of pixels include a plurality of chroma channels and a luminance channel, and wherein the backward reshaping function includes a luma-weighted reshaping function for each chroma channel of the plurality of chroma channels.
(28) The method according to (27), wherein the backward reshaping function includes a first-order reshaping function for the luminance channel.
(29) The method according to any one of (21) to (28), wherein the backward reshaping function includes backward reshaping parameters expressed as luma and chroma first order polynomials.
(30) A non-transitory computer-readable medium storing instructions that, when executed by an electronic processor, cause the electronic processor to perform operations comprising any one of (21) to (29).
(31) A method for decoding video data, the method comprising: receiving a coded bit stream, the coded bit stream including a plurality of image frames, each image frame including a plurality of pixels, receiving, for each image frame, decoding metadata, determining, based on the decoding metadata, a backward reshaping function, determining, for each image frame, at least one of a scaling factor and an offset factor, determining, for each image frame, a rotation matrix, wherein applying the rotation matrix to each pixel of the plurality of pixels rotates the video data around a chroma-neutral point, and generating an output image for each image frame by applying the backward reshaping function, the at least one of the scaling factor and the offset factor, and the rotation matrix to the respective image frame, wherein the rotation matrix is applied to each pixel of the plurality of pixels of the respective image frame before the backward reshaping function is applied to the respective image frame.
(32) The method according to (31), wherein the decoding metadata includes the backward reshaping function, the rotation matrix, and the at least one of the scaling factor and the offset factor.
(33) The method according to any one of (31) to (32), further comprising up-sampling the received coded bit stream to 4:4:4 format.
(34) The method according to any one of (31) to (33), wherein, after applying the scaling factor, a vector defining color channels of each pixel has a magnitude of greater than or equal to 1.
(35) The method according to any one of (31) to (34), wherein the received color bit stream is of a first color space, and wherein the method further comprises converting the video data from the first color space to a second color space.
(36) The method according to (35), wherein the first color space is a color space with one luma axis and two chroma axes, and wherein the second color space is an RGB color space.

(37) The method according to (36), wherein the backward reshaping function includes a first-order reshaping function for the luminance channel.

(38) The method according to any one of (31) to (37), wherein each pixel of the plurality of pixels include a plurality of chroma channels and a luminance channel, and wherein the backward reshaping function includes a luma-weighted reshaping function for each chroma channel of the plurality of chroma channels

(39) The method according to any one of (31) to (38), wherein the backward reshaping function includes backward reshaping parameters expressed as luma and chroma first order polynomials

(40) A non-transitory computer-readable medium storing instructions that, when executed by an electronic processor, cause the electronic processor to perform operations comprising any one of (31) to (39).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

Various aspects of the present invention may be appreciated from the following enumerated example embodiments (EEEs):

EEE1. A method for encoding video data, the method comprising:
  receiving the video data, the video data composed of a plurality of image frames, each image frame including a plurality of pixels;
  determining, for each image frame, a rotation matrix, wherein applying the rotation matrix to each pixel of the plurality of pixels rotates the video data around a chroma-neutral point in a three dimensional color space;
  determining, for each image frame, at least one of a scaling factor and an offset factor;
  determining, for each image frame, a reshaping function based on one or more values of each of the plurality of pixels; and
  generating an output image for each image frame by applying the rotation matrix, the reshaping function, and the at least one of the scaling factor and the offset factor to the respective image frame,
  wherein the rotation matrix is applied to each pixel of the plurality of pixels for the respective image frame before the reshaping function is applied to the respective image frame.

EEE2. The method of EEE 1, further comprising:
  generating, for each image frame, reverting metadata including an inverse rotation matrix, an inverse reshaping function, and the at least one of the scaling factor and the offset factor; and
  providing the output image and the reverting metadata to a decoder configured to decode the received output image using the reverting metadata.

EEE3. The method of EEE 1 or EEE 2, wherein each pixel of the plurality of pixels includes one or more chroma channels, the method further comprising:
  determining, for each image frame, a range of base layer codewords for each chroma channel based on a ratio of a chroma range to a luma range of the image frame.

EEE4. The method of EEE 3, wherein the chroma-neutral point is shifted to a center of the base layer axis.

EEE5. The method according to any one of EEEs 1 to 4, wherein, after applying the scaling factor, a vector defining color channels of each pixel has a magnitude of less than or equal to 1.

EEE6. The method according to any one of EEEs 1 to 5, wherein each pixel includes a luminance value, a Cb value, and a Cr value, and wherein the method further comprises:
  dividing the luminance value of each pixel into a predetermined number of codewords; computing a luma-bin index for each pixel;
  setting a minimum pixel value and a maximum pixel value for the Cb value and the Cr value of each pixel; and
  determining a three dimensional envelope of the video data.

EEE7. The method of EEE 6, wherein the at least one of the scaling factor and the offset factor are determined using the three dimensional envelope such that the image frame data after applying the rotation matrix is contained within the original three dimensional space.

EEE8. The method of EEE 6 or EEE 7, further comprising multiplying each pixel of the plurality of pixels by an allowed signal range divided by a range of the three dimensional envelope.

EEE9. The method according to any one of EEEs 6 to 8, wherein the minimum pixel value and the maximum pixel value for the Cb value and the Cr value of each pixel are used to determine the rotation matrix.

EEE10. A non-transitory computer-readable medium storing instructions that, when executed by an electronic processor, cause the electronic processor to perform operations comprising the method according to any one of EEEs 1 to 9.

EEE11. A method for encoding video data, the method comprising:
  receiving the video data, the video data composed of a plurality of image frames, each image frame including a plurality of pixels;
  determining, for each image frame, a rotation matrix, wherein applying the rotation matrix to each pixel of the plurality of pixels rotates the video data around a chroma-neutral point in a three dimensional color space;
  determining, for each image frame, at least one of a scaling factor and an offset factor;
  determining, for each image frame, a reshaping function based on one or more values of each of the plurality of pixels; and
  generating an output image for each image frame by applying the rotation matrix, the reshaping function, and the at least one of the scaling factor and the offset factor to the respective image frame,
  wherein the reshaping function is applied to the respective image frame before the rotation matrix is applied to each pixel of the plurality of pixels for the image frame.

EEE12. The method of EEE 11, further comprising:
  generating, for each image frame, reverting metadata including an inverse rotation matrix, an inverse reshaping function, and the at least one of the scaling factor and the offset factor; and
  providing the output image and the reverting metadata to a decoder configured to decode the received output image using the reverting metadata.

EEE13. The method of EEE 11 or EEE 12, wherein the reshaping function includes a primary luma reshaping function and a reshaped-domain additive offset.

EEE14. The method of EEE 13, wherein the primary luma reshaping function is a linear stretch.

EEE15. The method according to any one of EEEs 11 to 14, wherein the reshaping function includes a chroma reshaping with chroma codeword-utilization factors selected to scale a resulting codeword-range within a minimum codeword range and a maximum codeword range.

EEE16. The method of EEE 15, wherein decreasing the chroma codeword-utilization factors increases a number of luma codewords.

EEE17. The method according to any one of EEEs 11 to 16, wherein each pixel includes a luminance value, a Cb value, and a Cr value, and wherein the method further comprises:
  dividing the luminance value of each pixel into a predetermined number of codewords; computing a luma-bin index for each pixel;
  setting a minimum pixel value and a maximum pixel value for the Cb value and the Cr value of each pixel; and
  determining a three dimensional envelope of the video data.

EEE18. The method of EEE 17, further comprising:
  applying, for each image frame, the rotation matrix to the three dimensional envelope; and
  determining, for each image frame, a pair of angles of rotation in which all pixels of the plurality of pixels for the image frame are rotated by the rotation matrix without clipping.

EEE19. The method according to any one of EEEs 11 to 18, wherein the output image is defined by a base layer codewords, and wherein the base layer codewords exceeds 255 codewords in luma.

EEE20. A non-transitory computer-readable medium storing instructions that, when executed by an electronic processor, cause the electronic processor to perform operations comprising the method according to any one of EEEs 11 to 19.

EEE21. A method for encoding video data, the method comprising:
  receiving the video data, the video data composed of a plurality of image frames, each image frame including a plurality of pixels;
  determining, for each image frame, a rotation matrix, wherein applying the rotation matrix to each pixel of the plurality of pixels rotates the video data around a point in a three dimensional color space defined by a luma axis (e.g. "Y") and first and second chroma axes (e.g. "Cr" and "Cb"), wherein applying the rotation matrix to each pixel rotates a signal (or vector) representing the pixel around the first chroma axis and the second chroma axis;
  determining, for each image frame, at least one of a scaling factor and an offset factor;
  determining, for each image frame, a reshaping function based on one or more values of each of the plurality of pixels; and
  generating an output image for each image frame by applying the rotation matrix, the reshaping function, and the at least one of the scaling factor and the offset factor to the respective image frame.

EEE22. The method according to EEE 21, wherein applying the rotation matrix to each pixel of the plurality of pixels rotates the video data around a chroma neutral point in the three dimensional color space.

EEE23. The method according to any one of EEEs 21 to 22, further comprising:
  generating, for each image frame, reverting metadata including an inverse rotation matrix, an inverse reshaping function, and the at least one of the scaling factor and the offset factor; and
  providing the output image and the reverting metadata to a decoder configured to decode the received output image using the reverting metadata.

EEE24. The method according to any one of EEEs 21 to 23, wherein the rotation matrix is applied to each pixel of the plurality of pixels for the respective image frame before the reshaping function is applied to the respective image frame.

EEE25. The method according to EEE 24, wherein each pixel of the plurality of pixels includes first and second chroma channels, the method further comprising:
  determining, for each image frame, a range of base layer codewords for each chroma channel based on a ratio of a chroma range to a luma range of the image frame.

EEE26. The method according to any one of EEEs 24 to 25, wherein each pixel includes a luminance value of a luminance channel, a Cb value of a Cb channel, and a Cr value of a Cr channel, and wherein the method further comprises, for each image frame:

dividing a luminance channel signal range into a predetermined number of codeword bins, each indexed by a luma-bin index;
computing a luma-bin index for each pixel;
determining a minimum Cb and Cr value and a maximum Cb and Cr value of each non-empty bin, wherein the minimum Cb and Cr values and the maximum Cb and Cr values are samples defining corners of a bounding rectangle for each respective non-empty bin; and
determining a three dimensional envelope formed by the samples for each non-empty bin;
wherein the at least one of the scaling factor and the offset factor are determined using the three dimensional envelope such that the image frame data after applying the rotation matrix and the at least one of the scaling factor and the offset factor is contained within the original three dimensional space.

EEE27. The method according to EEE 26, wherein applying the scaling factor comprises multiplying each pixel of the plurality of pixels by an allowed signal range divided by a range of the three dimensional envelope.

EEE28. The method according to EEE 27, wherein determining the scaling factor comprises:
applying the rotation matrix to the samples for the non-empty bins to obtain samples of the three dimensional envelope in a rotated domain;
in each axis of the rotated domain, determining a minimum value and maximum value of the samples of the three dimensional envelope;
computing a range of the three dimensional envelope in each axis in the rotated domain using the minimum and maximum values in the respective axis; and
computing a scaling factor for each axis by dividing an allowed signal range for the respective axis by the range of the three dimensional envelope for the respective axis.

EEE29. The method according to any one of EEEs 26 to 28, wherein a luminance value for each bin is the center value in the respective bin.

EEE30. The method according to any one of EEEs 21 to 23, wherein the reshaping function is applied to the respective image frame before the rotation matrix is applied to each pixel of the plurality of pixels for the image frame.

EEE31. The method according to EEE 30, wherein the reshaping function includes a chroma reshaping with chroma codeword-utilization factors selected to scale a resulting codeword-range within a minimum codeword range and a maximum codeword range.

EEE32. The method according to EEE 31, wherein decreasing the chroma codeword-utilization factors increases a number of luma codewords.

EEE33. The method according to any one of EEEs 30 to 32, wherein each pixel includes a luminance value of a luminance channel, a Cb value of a Cb channel, and a Cr value of a Cr channel, and wherein the method further comprises, for each image frame:
dividing a luminance channel signal range into a predetermined number of codeword bins, each indexed by a luma-bin index;
computing a luma-bin index for each pixel;
determining a minimum Cb and Cr value and a maximum Cb and Cr value of each non-empty bin, wherein the minimum Cb and Cr values and the maximum Cb and Cr values are samples defining corners of a bounding rectangle for each respective non-empty bin;
determining a three dimensional envelope of the video data formed by the samples for each non-empty bin;
reshaping the samples of the three dimensional envelope; and
determining a pair of angles of rotation by which all reshaped samples of the three dimensional envelope are rotatable without clipping, wherein the pair of angles define the rotation matrix for the respective image frame.

EEE34. The method according to EEE 33, wherein a luminance value for each bin is the center value in the respective bin.

EEE35. The method according to any one of EEEs 21 to 34, wherein the reshaping function forward reshapes the video data to a lower bit-depth base layer.

EEE36. A method for decoding video data, the method comprising:
receiving a coded bit stream, the coded bit stream including a plurality of image frames, each image frame including a plurality of pixels,
receiving, for each image frame, decoding metadata,
determining, based on the decoding metadata, a backward reshaping function,
determining, for each image frame, at least one of a scaling factor and an offset factor,
determining, for each image frame, a rotation matrix, wherein applying the rotation matrix to each pixel of the plurality of pixels rotates the video data around a point in a three dimensional color space defined by a luma axis and first and second chroma axes, wherein applying the rotation matrix to each pixel rotates a signal representing the pixel around the first chroma axis and the second chroma axis, and
generating an output image for each image frame by applying the backward reshaping function, the at least one of the scaling factor and the offset factor, and the rotation matrix to the respective image frame.

EEE37. The method according to EEE 36, wherein the backward reshaping function is applied to the respective image frame before the rotation matrix is applied to each pixel of the plurality of pixels of the respective image frame.

EEE38. The method according to EEE 36, wherein the rotation matrix is applied to each pixel of the plurality of pixels of the respective image frame before the backward reshaping function is applied to the respective image frame.

EEE39. A non-transitory computer-readable medium storing instructions that, when executed by an electronic processor, cause the electronic processor to perform operations comprising the method according to any one of EEEs 21 to 38.

What is claimed is:

1. A method for encoding video data, the method comprising:
receiving the video data, the video data composed of a plurality of image frames, each image frame including a plurality of pixels;
determining, for each image frame, a rotation matrix, wherein applying the rotation matrix to each pixel of the plurality of pixels rotates the video data around a point in a three dimensional color space defined by a luma axis and first and second chroma axes, wherein applying the rotation matrix to each pixel rotates a signal representing the pixel around the first chroma axis and the second chroma axis;
determining, for each image frame, a reshaping function based on one or more values of each of the plurality of pixels, wherein each pixel of the plurality of pixels includes a luminance value of a luminance channel, a Cb value of a Cb channel, and a Cr value of a Cr channel;

dividing a luminance channel signal range into a predetermined number of codeword bins, each indexed by a luma-bin index;

computing the luma-bin index for each pixel;

determining, for each image frame, at least one of a scaling factor and an offset factor based on the luma-bin index for each pixel; and generating an output image for each image frame by applying the rotation matrix, the reshaping function, and the at least one of the scaling factor and the offset factor to the respective image frame.

2. The method according to claim 1, wherein applying the rotation matrix to each pixel of the plurality of pixels rotates the video data around a chroma neutral point in the three dimensional color space.

3. The method according to claim 1, further comprising:

generating, for each image frame, reverting metadata including an inverse rotation matrix, an inverse reshaping function, and the at least one of the scaling factor and the offset factor; and providing the output image and the reverting metadata to a decoder configured to decode the received output image using the reverting metadata.

4. The method according to claim 1, wherein the rotation matrix is applied to each pixel of the plurality of pixels for the respective image frame before the reshaping function is applied to the respective image frame.

5. The method according to claim 4, wherein each pixel of the plurality of pixels includes first and second chroma channels, the method further comprising:

determining, for each image frame, a range of base layer codewords for each chroma channel based on a ratio of a chroma range to a luma range of the image frame.

6. The method according to claim 1, wherein the method further comprises, for each image frame:

determining a minimum Cb and Cr value and a maximum Cb and Cr value of each non-empty bin, wherein the minimum Cb and Cr values and the maximum Cb and Cr values are samples defining the corners of a bounding rectangle for each respective non-empty bin; and determining a three dimensional envelope formed by the samples for each non-empty bin, wherein the at least one of the scaling factor and the offset factor are determined using the three dimensional envelope such that the image frame data after applying the rotation matrix and the at least one of the scaling factor and the offset factor is contained within the original three dimensional space.

7. The method according to claim 6, wherein applying the scaling factor comprises multiplying each pixel of the plurality of pixels by an allowed signal range divided by a range of the three dimensional envelope.

8. The method according to claim 7, wherein determining the scaling factor comprises:

applying the rotation matrix to the samples for the non-empty bins to obtain samples of the three dimensional envelope in a rotated domain;

in each axis of the rotated domain, determining a minimum value and maximum value of the samples of the three dimensional envelope;

computing a range of the three dimensional envelope in each axis in the rotated domain using the minimum and maximum values in the respective axis; and computing a scaling factor for each axis by dividing an allowed signal range for the respective axis by the range of the three dimensional envelope for the respective axis.

9. The method according to claim 1, wherein the reshaping function forward reshapes the video data to a lower bit-depth base layer.

10. A non-transitory computer-readable medium storing instructions that, when executed by an electronic processor, cause the electronic processor to perform operations comprising the method according to claim 1.

11. A method for decoding video data, the method comprising:

receiving a coded bit stream, the coded bit stream including a plurality of image frames, each image frame including a plurality of pixels, receiving, for each image frame, decoding metadata, determining, based on the decoding metadata, a backward reshaping function, determining, for each image frame, at least one of a scaling factor and an offset factor, wherein at least one of the scaling factor and the offset factor are determined based on a luma-bin index for each pixel, the luma-bin index determined by dividing a luminance channel signal range into a predetermined number of codeword bins, each indexed by the luma-bin index, determining, for each image frame, a rotation matrix, wherein applying the rotation matrix to each pixel of the plurality of pixels rotates the video data around a point in a three dimensional color space defined by a luma axis and first and second chroma axes, wherein applying the rotation matrix to each pixel rotates a signal representing the pixel around the first chroma axis and the second chroma axis, wherein each pixel of the plurality of pixels includes a luminance value of a luminance channel, a Cb value of a Cb channel, and a Cr value of a Cr channel, and generating an output image for each image frame by applying the backward reshaping function, the at least one of the scaling factor and the offset factor, and the rotation matrix to the respective image frame.

12. The method according to claim 11, wherein the backward reshaping function is applied to the respective image frame before the rotation matrix is applied to each pixel of the plurality of pixels of the respective image frame.

* * * * *